United States Patent
Gu et al.

(10) Patent No.: US 8,284,686 B2
(45) Date of Patent: *Oct. 9, 2012

(54) ANTENNA/BEAM SELECTION TRAINING IN MIMO WIRELESS LANS WITH DIFFERENT SOUNDING FRAMES

(75) Inventors: Daqing Gu, Burlington, MA (US);
Hongyuan Zhang, Sunnyvale, CA (US);
Jinyun Zhang, Cambridge, MA (US);
Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 856 days.

This patent is subject to a terminal disclaimer.

(21) Appl. No.: 12/293,458

(22) PCT Filed: Mar. 30, 2006

(86) PCT No.: PCT/US2006/011574
§ 371 (c)(1),
(2), (4) Date: Sep. 18, 2008

(87) PCT Pub. No.: WO2007/114804
PCT Pub. Date: Oct. 11, 2007

(65) Prior Publication Data
US 2009/0290563 A1  Nov. 26, 2009

Related U.S. Application Data

(63) Continuation-in-part of application No. PCT/US2005/042358, filed on Nov. 21, 2005.

(51) Int. Cl.
*H04W 4/00* (2009.01)
(52) U.S. Cl. ........ 370/252; 370/255; 370/328; 370/334; 370/389; 370/437

(58) Field of Classification Search .................. 370/208, 370/252, 254, 255, 311, 328, 334, 343, 344, 370/389, 431, 437, 465, 480
See application file for complete search history.

(56) References Cited

U.S. PATENT DOCUMENTS

2005/0232208 A1 * 10/2005 Hansen ................ 370/338
2006/0270343 A1 * 11/2006 Cha et al. ............. 455/25
2006/0274847 A1   12/2006 Molisch

OTHER PUBLICATIONS

Sudarshan, P., Mehta, N. B., Molisch, A.F., Zhang, J., "Spatial Multiplexing and Channel Statistics-Based RF Pre-Processing for Antenna Selection," *Globecom*, Nov. 2004.
IEEE 802.11-04/0889r7, "TGn Sync Proposal Technical Specification,".
IEEE 802.11-05/1095r3, "Joint Proposal: High throughput extension to the 802.11 Standard: MAC,".
IEEE 802.11-05/1102r2, "Joint Proposal: High throughput extension to the 802.11 Standard: PHY,".

* cited by examiner

*Primary Examiner* — Yemane Mesfin
*Assistant Examiner* — Mon Cheri Davenport
(74) *Attorney, Agent, or Firm* — Dirk Brinkman; Gene Vinokur

(57) ABSTRACT

A method selects antennas in a multiple-input, multiple-output (MIMO) wireless local area network (WLAN) that includes a plurality of stations, and each station includes a set of antennas. Plural consecutive packets, received at a station, include plural consecutive sounding packets. Each sounding packet corresponds to a different subset of the set of antennas, and at least one of the plural consecutive packets includes a high throughput (HT) control field including a signal to initiate antenna selection and a number N indicative of a number of sounding packets which follow the at least one packet including the HT control field and which are to be used for antenna selection. A channel matrix is estimated based on a characteristic of the channel as indicated by the received N sounding packets, and a subset of antennas is selected according to the channel matrix. Station and computer program product embodiments include similar features.

28 Claims, 21 Drawing Sheets

100

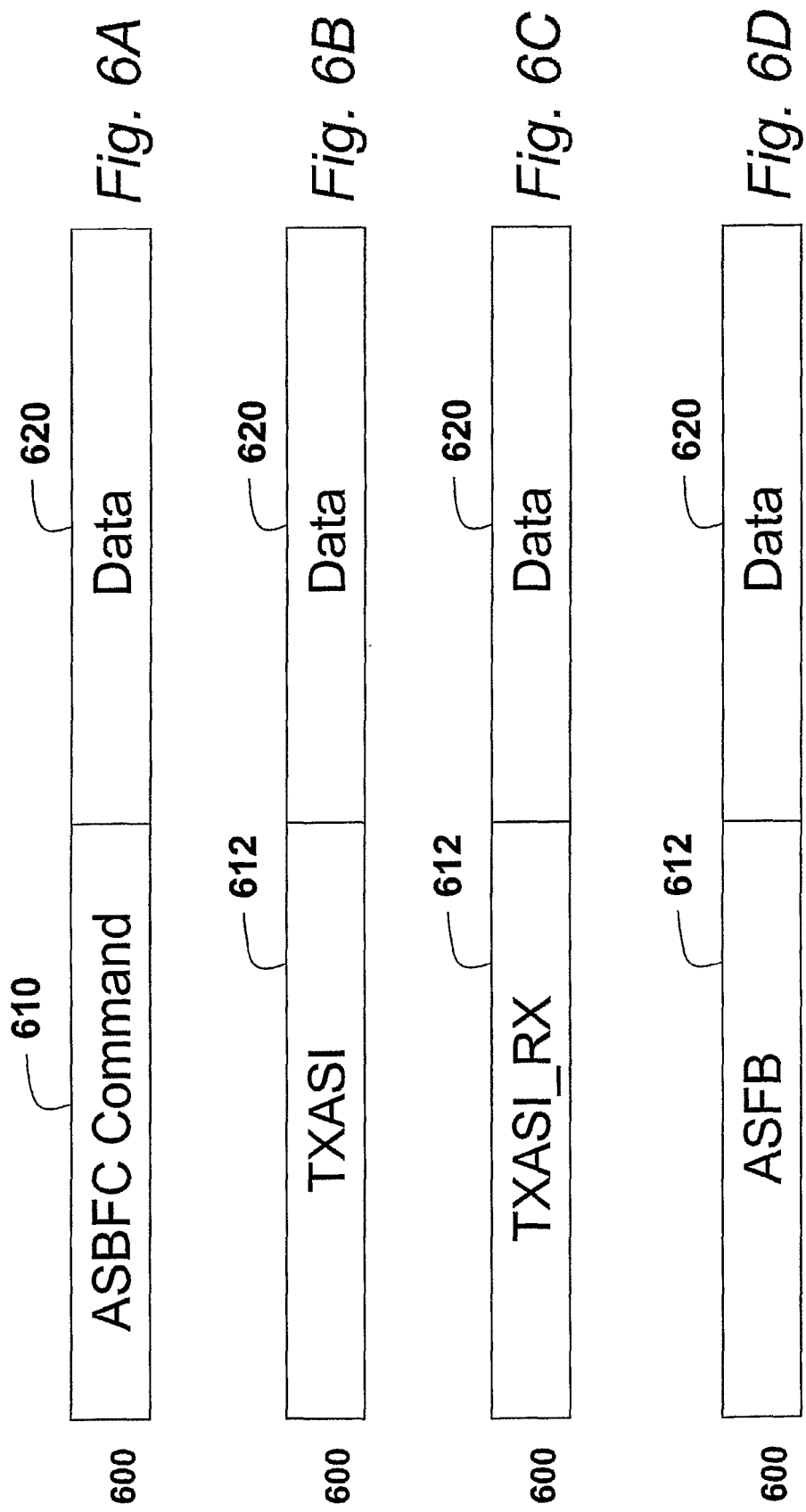

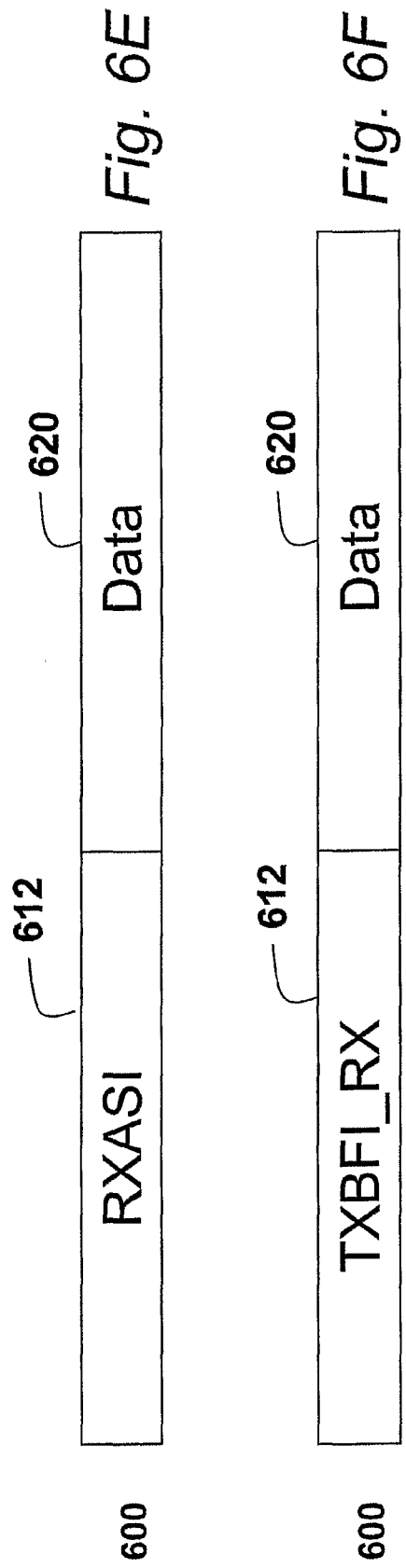

ANTENNA/BEAM SELECTION TRAINING IN MIMO WIRELESS LANS WITH DIFFERENT SOUNDING FRAMES

RELATED APPLICATION

This application is a Continuation-in-Part of, and claims priority to, PCT Application No. PCT/US2005/042358, "Method for Selecting Antennas and Beams in MIMO Wireless LANs," filed by Gu et al. on Nov. 21, 2005.

BACKGROUND OF THE INVENTION

1. Field of the Invention

This invention relates generally to multiple-input, multiple-output wireless local area networks, and more particularly to selecting antennas and beams in such networks.

2. Description of the Related Art

Multiple-input, multiple-output (MIMO) techniques can significantly increase system capacity in a scattering environment of a wireless network. However, the use of more antennas increases the hardware complexity and cost because in a typical system, each transmit/receive antenna requires a separate RF chain including a modulator/demodulator, an AD/DA converter, an up/down converter, and a power amplifier. In addition, the processing complexity at the baseband also increases with the number of antennas.

Antenna/beam selection can reduce the number of RF chains while still taking advantage of the capacity/diversity increase provided by multiple antennas. In a wireless local area network (WLAN), stations are typically operated at a high signal to noise ratio (SNR), in which diversity plays a key role in protecting the system from a deep fading channel. Furthermore, it is known that the state of a WLAN channel changes slowly. Therefore, it is advantageous to perform antenna/beam selection in a WLAN.

The idea of antenna/beam selection is to select a submatrix from a complete channel matrix or a transformed channel matrix for beam selection, according to some predetermined criteria. To perform antenna/beam selection, the complete channel matrix is estimated by sending training (sounding) frames that enable the antenna selection station to measure the complete channel state information (CSI). Conventionally, explicit signaling is used in the physical (PHY) or media access (MAC) layer by sending training frame(s) for all the antennas to be selected. However, the additional overheads are undesirable due to practical limitations. On the other hand, the slowly varying WLAN channel environment can advocate a more efficient antenna/beam selection training scheme which requires little or no changes in the MAC and PHY layers.

Structure of IEEE 802.11n WLAN Link Adaptation Control (LAC) Mechanisms in MAC Layer As shown in FIG. 1 and FIG. 12, the WLAN IEEE 802.11n standard, incorporated herein by reference, also known as WiFi, proposes to specify a fast link adaptation control (LAC) mechanism defined at the MAC layer for supporting MIMO training requests and exchange of link adaptation information. In general, the LAC functionality can be realized either by a single control frame defined as LAC, or the single control frame can be a High Throughput (HT) Control frame, or a HT Control (HTC) Field can be incorporated into any MAC layer frame, which is named as +HTC frame. As shown in FIG. 1, LAC frame contains the following fields: a MAC header 110, a LAC mask 120 for indicating the logical elements carried in the current control frame, a modulation coding scheme (MCS) feedback field 130 for indicating transmitting parameters, and a frame check sequence (FCS) 140 for error detection. The MAC header 110 applies for any MAC layer packet, which includes a frame control 111, duration 112, a receive address (RA) 113, and a transmit address (TA) 114. The LAC frame is described in detail in IEEE 802.11-04/0889r7, "TGn Sync Proposal Technical Specification," incorporated herein by reference.

The LAC frame supports control of MIMO training requests and exchange of link adaptation information. The LAC frame can be sent by either an initiator station (transmitter) or a recipient station (receiver).

FIG. 2 shows the LAC mask field 120 in greater detail. Without considering antenna/beam selection, the LAC mask field 120 includes the following: RTS (request to send) 121, CTS (clear to send) 122, TRQ (MIMO training request) 123, MRQ (request for MCS feedback) 124, and MFB (MCS feedback) 125. The three bits 126 are reserved. In the MCS feedback case, i.e., MFB=1, the MCS set is indicated in the 'MCS feedback' field 130 in FIG. 1.

An HT Control Field 1200 includes a LAC field 1201 which controls the fast link adaptation training process; and several other fields 1202 dedicated for other HT control features. Without considering antenna/beam selection, the LAC field of an HT control field includes: MA 1210, TRQ 1220, MRQ 1230, MRS 1240 (MRQ sequence number), MFS 1250 (MFB sequence number), and MFB 1260 with 7 bits functioning as the MCS feedback field in the above LAC frame. The HT Control Field is described in detail in IEEE 802.11-05/1095r3, "Joint Proposal: High throughput extension to the 802.11 Standard: MAC," incorporated herein by reference.

Structure of IEEE 802.11n WLAN Channel Sounding Mechanisms Defined in PHY Layer

A sounding packet is defined as any packet containing the training information (residing in PHY layer header) of all the available transmitting chains (or MIMO channel dimensions). There are two major categories of sounding packets defined in the PHY layer of high throughput WLAN: the first one is regular sounding packets, which can be any ordinary packet with the additional training information for the extra channel dimensions other than those used for data transmissions, if there is any; the second category is named as zero-length frame (ZLF), which contains only PHY layer header with the training information of all the available transmitting chains. Based on the above definitions, a regular sounding packet may contain a HT control field in the MAC header (i.e. a +HTC frame), while ZLF is not allowed to contain HT control field. Therefore any MAC layer signaling in a sounding packet (e.g., in TxBF or antenna selection) with ZLF format should be designed in a way different from that with regular sounding packet. Note that the regular +HTC frame sent immediate before one ZLF or several consecutive ZLFs should indicate the subsequent ZLF(s) in its HT control field (by setting the ZLF bit as in FIG. 12), and the subsequent ZLF(s) shall follow the same destination address as that of the immediate previous +HTC frame. The sounding packets is described in detail in IEEE 802.11-05/1102r2, "Joint Proposal: High throughput extension to the 802.11 Standard: PHY," incorporated herein by reference.

Closed-Loop MIMO Training Methods for IEEE 802.11n WLAN

The IEEE 802.11n standard requires a throughput of 100 megabits per second (Mbps) at the medium access control (MAC) layer service access point (SAP). Based on the channel property in WLAN environment, closed-loop schemes are preferred for increased throughput, including transmit beam forming (TXBF), MCS adaptation, and antenna/beam selection.

Each PHY layer packet is composed by two portions: preamble and data. The PHY packet preamble includes training information for channel estimation at the receiver. Typically, in a conventional PHY layer packet, the number of antennas or spatial streams indicated in the training field can be less than the maximum number provided by the MIMO channel. A sounding packet is a specific PHY layer packet, which contains the training information for all the available data streams in the MIMO channel, no matter how many data streams are used for transmitting the data portion. When the concept of sounding packet is not applied in the system, an alternative category of PHY layer training packet is the one that enforces a MCS set utilizing all the available data streams in the MIMO channel, so that not only the preamble contains the full training information of the MIMO channel, the data portion is also transmitted using all the available data streams.

MCS Training Process

FIG. 3 shows a conventional MIMO training process for MCS adaptation based on LAC frame however, it should be understood that an HT control field can also be used. An initiator (transmit) station STA A 301 sends a LAC frame 310 with MRQ=1, or a frame containing HT Control Field with MRQ=1, and MRS equal to a corresponding sequence number, to a recipient (receive) station STA B 302. The initiator also requests its PHY layer to signal a sounding packet. In response to receiving the MRQ and the sounding packet, the recipient 302 estimates the MIMO channel and determines an appropriate MCS set for the current channel. Then, the recipient replies to the initiator a LAC frame 320 with MFB set to 1, and the MCS feedback field 130 contains the selected MCS set, or a frame including a HT Control Field with MFS equal to the MRS in the received frame it is currently responding to, and with MFB including a selected MCS set.

The recipient 302 can also initiate the MCS training process whenever it has the complete MIMO channel knowledge, by determining the MCS and sending an MFB with MCS feedback directly without any matching MRQ element. This is called unsolicited adaptation.

TXBF Training Process

FIG. 4 shows a conventional transmit beam forming (TXBF) training process based on LAC frame. Again, it should be understood that a HT control field can be used, if corresponding TXBF training functionalities are defined in the reserved fields described above. The initiator 301 sends out a LAC frame 410 with TRQ set to 1 to the recipient 302. In response to receiving the TRQ, the recipient sends back a sounding packet 420 to the initiator. Upon receiving the sounding packet, the initiator estimates the MIMO channel and updates its beam forming steering matrices. Up to now, recipient initiated TXBF training is not defined.

For antenna selection, some prior art training methods use a single PHY layer training frame (e.g., sounding packet) containing the training information for all the antennas to be selected, and different antenna subsets are subsequently connected to the RF chains for this single training frame. This introduces overhead on existing training frame designs.

In another training method, a long sequence of training frames is transmitted from a receive station to a transmit station, and in response the transmit station transmits a short sequence of training frames so that both the transmit and receive station can perform channel estimation and antenna selection, see U.S. patent application Ser. No. 11/127,006 "Training Frames for MIMO Stations," filed by Andreas Molisch, Jianxuan Du and Daqing Gu on May 11, 2005, incorporated herein by reference.

SUMMARY OF THE INVENTION

One object of this invention is to provide a novel method for selecting antennas in a multiple-input, multiple-output (MIMO) wireless local area network (WLAN) including a plurality of stations, each station including a set of antennas. The method includes receiving, via a channel, at a station in the WLAN plural consecutive packets including plural sounding packets, each sounding packet corresponding to a different subset of the set of antennas. At least one of the plural consecutive packets includes (i) a high throughput (HT) control field including a signal to initiate antenna selection and (ii) a number N indicative of a number of sounding packets which follow the at least one packet including the HT control field and which are to be used for antenna selection. The method also includes estimating a channel matrix based on a characteristic of the channel as indicated by the received N sounding packets, and selecting a subset of antennas according to the channel matrix.

Another object of this invention is to provide a novel station in a multiple-input, multiple-output (MIMO) wireless local area network (WLAN) including a plurality of stations, each station including a set of antennas. The station includes a receiver configured to receive, via a channel, plural consecutive packets including plural sounding packets each corresponding to a different subset of the set of antennas. At least one of the plural consecutive packets includes (i) a high throughput (HT) control field including a signal to initiate antenna selection and (ii) a number N indicative of a number of sounding packets which follow the at least one packet including the HT control field and which are to be used for antenna selection. The station also includes an estimating unit configured to estimate a channel matrix based on a characteristic of the channel as indicated by the received N sounding packets, and a selecting unit configured to select a subset of antennas according to the channel matrix.

Another object of this invention is to provide a novel computer program product storing program instructions which, when executed on a computer to select antennas in a multiple-input, multiple-output (MIMO) wireless local area network (WLAN) including a plurality of stations, each station including a set of antennas. The execution of the instructions results in the computer performing steps that include receiving plural consecutive packets including plural sounding packets via a channel at a station in the WLAN. Each sounding packet corresponds to a different subset of the set of antennas, and at least one of the plural consecutive packets includes (i) a high throughput (HT) control field including a signal to initiate antenna selection and (ii) a number N indicative of a number of sounding packets which follow the at least one packet including the HT control field and which are to be used for antenna selection. The execution of the instructions also results in the computer performing steps of estimating a channel matrix based on a characteristic of the channel as indicated by the received N sounding packets, and selecting a subset of antennas according to the channel matrix.

BRIEF DESCRIPTION OF THE DRAWINGS

FIG. 6A is a block diagram of an ASBFC field of the LAC frame according to an embodiment of the invention;

FIG. 6B is a block diagram of a TXASI command in an ASBFC field of the LAC frame according to an embodiment of the invention;

FIG. 6C is a block diagram of a TXASI_RX command in an ASBFC field of the LAC frame according to an embodiment of the invention;

FIG. 6D is a block diagram of a ASFB command in an ASBFC field of the LAC frame according to an embodiment of the invention;

FIG. 6E is a block diagram of a RXASI command in an ASBFC field of the LAC frame according to an embodiment of the invention;

FIG. 6F is a block diagram of a TXBFI_RX command in an ASBFC field of the LAC frame according to an embodiment of the invention;

DETAILED DESCRIPTION OF THE PREFERRED EMBODIMENTS

The invention provides a training method for selecting antennas/beams in a MIMO wireless local area network (WLAN). The method operates at the MAC layer. Compared with prior art antenna/beam selection training methods, the method according to the invention does not require a modification of the PHY layer.

The training method rapidly sends multiple training frames, designated as sounding packets. Each sounding packet conforms to a conventional PHY layer design and is for a different subset of all of the available antennas so that characteristics of the entire channel can be estimated by the receiver of the sounding packets. The receiver of the sounding packets can select either transmit or receive antennas. The entire training method operates at the MAC layer.

The sounding packets, in addition to estimating the MIMO channel for selecting antennas/beams, can also include data which makes the method extremely efficient because estimating and data transfer are performed concurrently. Because the method operates at the MAC layer, the method may have less overhead than conventional methods that operate at both the MAC and PHY layers.

To suppress the distortion caused by time variation of the channels, the sounding packets used for antenna/beam selection training may be sent consecutively by the transmitter. To maintain optimal performance, all the sounding packets may be sent within one transmit opportunity (TXOP) defined in MAC layer, during which only the two involved stations may communicate packets with each other. The data sent between the two involved stations may be sent in bursts with short inter-frame space (SIFS), without requiring acknowledgment from the receiver. In the case that the sounding packets are too long to be sent within one TXOP, the sounding packets may be sent in multiple TXOPs, and performance degradations may be determined by the gap(s) between adjacent TXOPs obtained by the two involved stations.

As an additional advantage, the method can be extended for a general closed-loop MIMO system, such as transmit beam forming training processes initiated by the receiver. Also, the antenna/beam selection training method can be combined with transmit beam forming to achieve additional performance improvements.

Figure 5A:
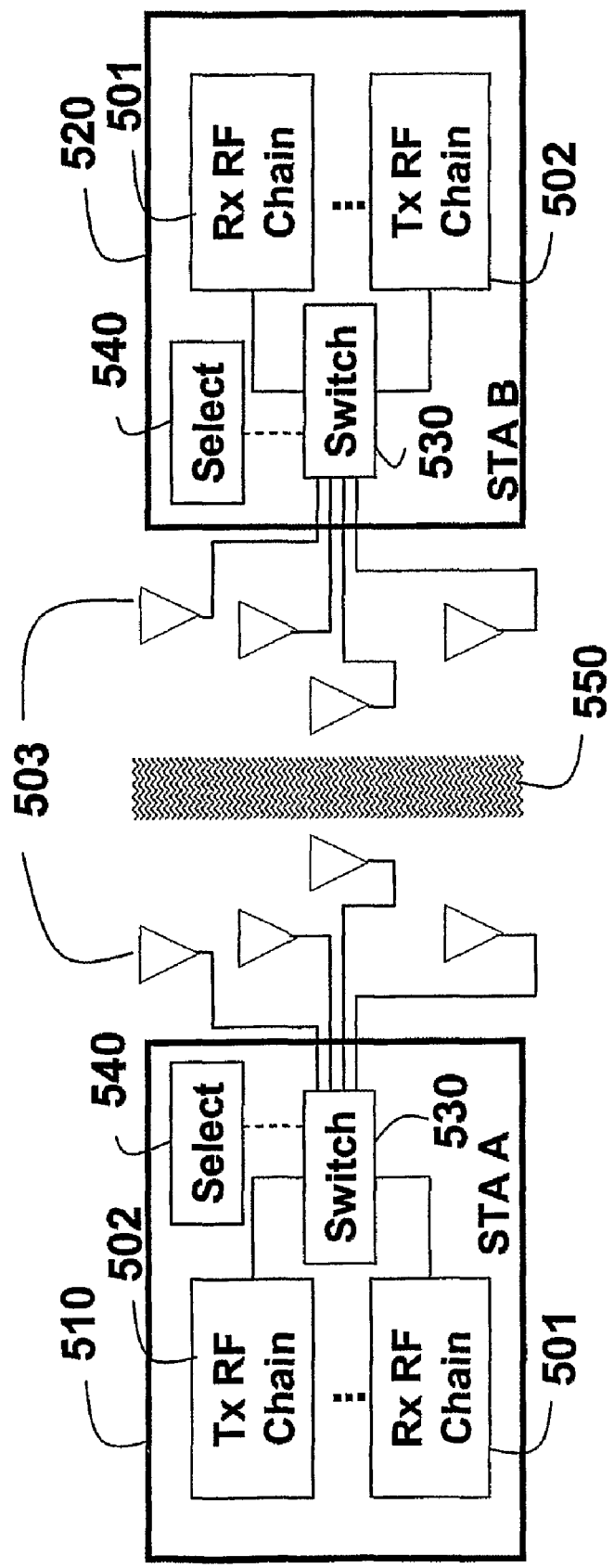
FIG. 5A is a block diagram of a MIMO system according to an embodiment of the invention.

FIG. 5A shows a multiple-input, multiple-output (MIMO) wireless local area network (WLAN) 100 according to an embodiment of the invention. The network includes a first station (STA A) 510 and a second station (STA B) 520. Either station can operate in receive or transmit mode. Generally, the station that transmits the data is called the transmit station, and the station that receives the data is called the receive station.

A 'set' as defined includes one or more elements; the number of elements in a 'subset' is equal to or less than the number of elements in the corresponding set.

Each station includes a set of receive (Rx) RF chains 501 and a set of transmit (Tx) RF chains 502 connected to a set of antennas 503 by switches 530. Generally, the number of antennas is larger than the number of RF chains. Therefore, a subset of antennas is selected from the set of total available antennas by a method 540 according to an embodiment of the invention during a training phase as described herein. The selection method can be initiated by either the transmitter or the receiver, and the selection can be conducted either at the transmitter or at the receiver.

Figure 5B:
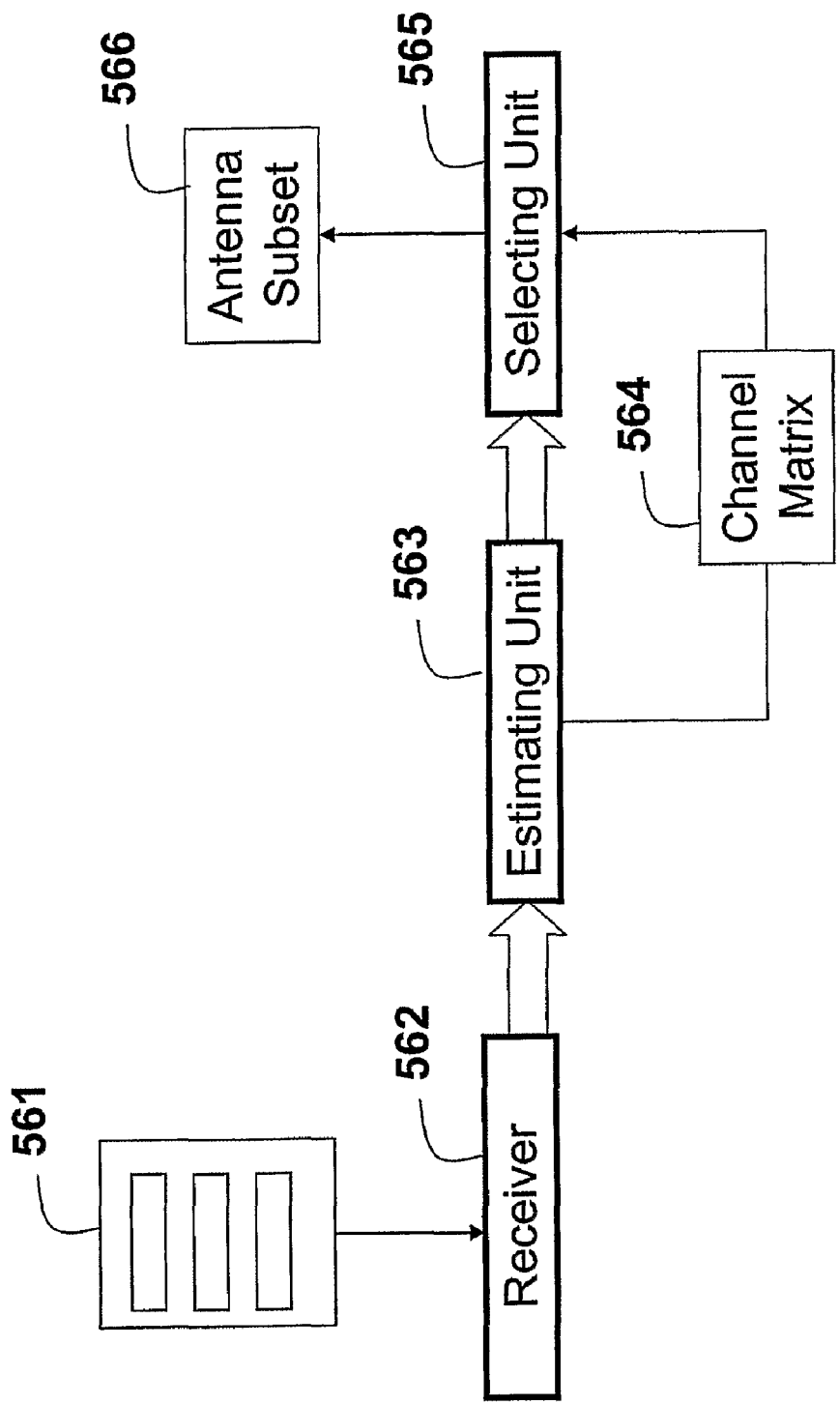
FIG. 5B is a flow diagram of a method for selecting antennas according to the invention.

As shown in FIG. 5B, a station may include a receiver 562 that receives multiple consecutively transmitted sounding packets 561. Consecutively transmitting or receiving a predetermined number of packets, as defined herein, means that the packets are transmitted one after the other, without any other intervening packets in either direction, and the number of packets is known to both stations before the sounding packets are sent. Preferably, the sounding packets are transmitted with a relatively short delay.

Further, in this example, an estimating unit 563 estimates a channel matrix 564 based on a characteristic of the channel as indicated by the received sounding packets 561, and a selecting unit 565 selects a subset of antennas 566 according to the channel matrix 564.

The method can also be used for closed-loop MIMO trainings initiated by a recipient station, e.g., STA B 520. The training process operates entirely at a media access (MAC) layer and is transparent to the physical (PHY) layer to minimize overhead.

System Model for MIMO Systems with Antenna/Beam Selection

In the MIMO WLAN 100, the transmitter or initiator station A has a set of $N_A$ antennas, and the receive or recipient station B has a set of $N_B$ antennas. A relationship between a transmitted signal and a received signal in a flat-fading channel 550 can be expressed as:

$$r_B = F_B^H(H_{A \to B} F_A s_A + n),$$

where $r_B$ is a $N_{B\_SS} \times 1$ received signal vector, $s_A$ is a $N_{A\_SS} \times 1$ transmitted signal vector, and $H_{A \to B}$ is a $N_B \times N_A$ channel matrix. A noise vector n has $N_B \times 1$ entries that are independent and identically distributed (i.i.d.) zero-mean circular complex Gaussian random variables with variance $N_0$. $F_A$ is a $N_A \times N_{A\_SS}$ transmit antenna/beam selection matrix, and $F_B$ is a $N_B \times N_{B\_SS}$ receive antenna/beam selection matrix. The matrices used for selection are submatrices of an identity matrix for pure antenna selection. In the case of beam forming, the matrices include orthogonally transformed columns of a unitary matrix. The equivalent channel matrix after antenna/beam selection is a $N_{B\_SS} \times N_{A\_SS}$ matrix $H_{eq} = F_B^H F_B^H H_{A \to B} F_A$, which is a submatrix of the channel matrix $H_{A \to B}$, or a submatrix of the transformed channel matrix for beam selection. The superscript 'H' means the conjugate transpose, which is used here for selection by the receiver.

The determination of $F_A / F_B$ is typically performed to optimize the capacity of the channel 550 and the signal-to-noise ratio (SNR). Here, only one side antenna/beam selection is considered, i.e., at least one of $F_A$ and $F_B$ equals the identity matrix, and the corresponding number of RF chains equals the number of antennas.

Antenna selection is performed by switching an output signal of a transmit RF chain 502 to a selected transmit antenna, or an input signal of a selected receive antenna to a receive RF chain 501. For beam selection, if magnitudes of all elements in the selection matrix are either zero or one, the selection 540 can be implemented in the RF domain using phase-shifters, switches, and linear combiners, Sudarshan, P., Mehta, N. B., Molisch, A. F., Zhang, J., "Spatial Multiplexing and Channel Statistics-Based RF Pre-Processing for Antenna Selection," *Globecom*, November 2004, incorporated herein by reference.

In both cases, the required number of RF chains to modulate/demodulate the transmitted/received signals is less than the total number of available transmit/receive antennas. Therefore, the cost of the system is reduced. During the initial association phase, the stations exchange information about the number of RF chains, the number of antenna elements, and the type of antenna/beam selection. In particular, the type of information contained in the feedback packet (e.g., whether it is the index of the antennas to be used, and/or the full (instantaneous) channel state information (CSI), and/or the average channel state information) is transmitted during that time or, alternatively, as part of the feedback packet.

MAC Based Training Scheme for MIMO Antenna/Beam Selection

LAC Frame

Figure 5C:
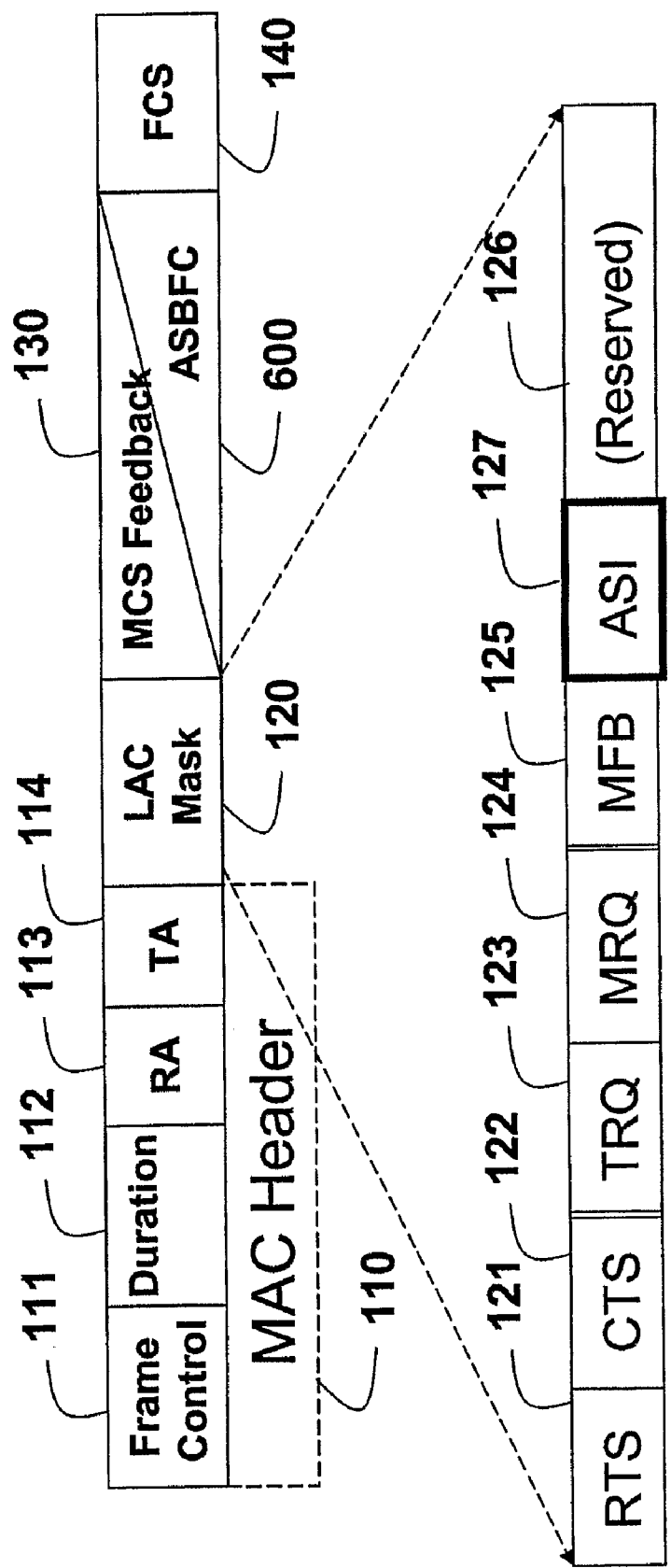
FIG. 5C is a block diagram of a LAC frame according to an embodiment of the invention.

FIG. 5C shows the structure of a link adaptation control (LAC) frame according to an embodiment of the invention. One of the reserved bits 126 in the LAC mask field 120, e.g., bit 127, acts as an antenna/beam selection indicator (ASI). If the ASI field 127 is set to 1, then field 130 is used for antenna/beam selection/transmitter beam forming control, (ASBFC) 600, as described below, otherwise the use of field 130 is conventional. That is, the field 130 functions as MCS feedback only with MFB=1. Therefore, to use the field 130 for ASBFC 600, both ASI and MFB cannot be set to 1. Alternatively, a new 1-byte ASBFC field can be included in the LAC frame, which eliminates restriction of simultaneous ASI and MFB.

FIG. 6A shows the structure of field 600, which includes a command field 610 and a data field 620. When used for ASBFC, the command field 610 is defined according to Table A. FIGS. 6B-6F show the structure of the command bit field 612 (i.e., bits B0-B3) that are defined for the commands TXASI, TXASI_RX, ASFB, RXASI and TXBFI_RX respectively. The undefined bit combinations of bit field 612 (i.e. bits B0-B3) are listed as reserved.

TABLE A

| B0~B3 | Command |
|---|---|
| 0 | TX Antenna/Beam Selection by TX Initiation (TXASI) |
| 1 | TX Antenna/Beam Selection by RX Initiation by RX (TXASI_RX) |
| 2 | Antenna/Beam Selection Feedback (ASFB) |
| 3 | RX Antenna/Beam Selection Initiation (RXASI) |
| 4 | TX Beam forming Initiation by RX (TXBFI_RX) |
| 5~15 | Reserved |

The five commands are described in greater detail below. The data field 620 carries data for training information, e.g., the number of sounding packets used for antenna/beam selection training.

Thus, only a minor modification to the LAC mask field of the LAC frame is required to perform antenna/beam selection and training as described herein, and the field 130 can be reused whenever an MFB is not necessary.

HT Control Field

Figure 12:
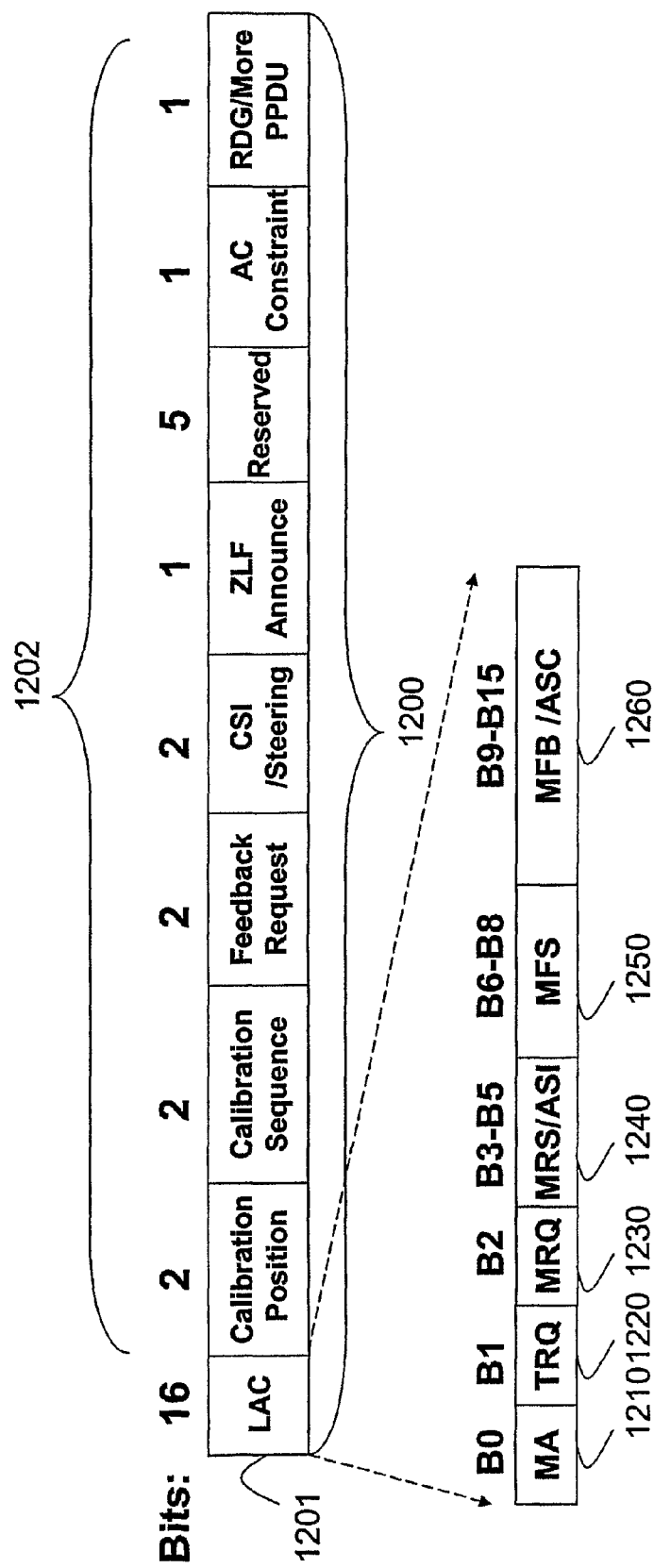
FIG. 12 is block diagram of a HT control field having a LAC field according to an embodiment of the invention.

As shown in FIG. 12, the HT control field 1200 includes a LAC field 1201 according to an embodiment of the invention, which controls the fast link adaptation training process, and several other fields 1202 dedicated for other HT control features. The LAC field 1201 is also shown in greater detail. Without considering antenna/beam selection, the LAC field includes: MA 1210, i.e. management action frame, TRQ 1220, i.e. sounding request, MRQ 1230, MRS 1240, i.e., MRQ sequence number, MFS 1250, i.e., MFB sequence number, and MFB 1260 with 7 bits functioning as the MCS feedback field in the above LAC frame. Note that the HT control field can be a single HT control frame, i.e., by adding a MAC header.

The prior art HT control field does not define the bit combination of "111" in MRS. We use the bit combination 111 to reserve the MFB field, i.e. "111" in MRS functions as the ASI in LAC frame.

Alternatively, we use the MFB field as antenna selection control (ASC) by using one reserved bit as ASI, either in the LAC field, or in one of the reserved portions in HT Control Field. When used for ASC, the structure of MFB/ASC is similar to the ASBFC field 600 as in FIG. 6, except for a reduced length (from 4 bits to 3 bits) in the data field. An alternative way is to reduce the command field to 3 bits so that the data field remains 4 bits. In this case, values of 5~7 in Table A act as reserved commands. An alternative solution is to add a new ASC field 1260 into the HT Control field, or use one of the unused bytes as ASC field.

Transmit Antenna/Beam Selection Training Method

The transmit antenna/beam selection can be initiated either by the transmitter 510 or by the receiver 520. Because the receiver is constantly monitoring the channel during the communication process, it is generally more efficient for the receiver to request the transmitter to start the training process and update the antenna subset or beam steering whenever the receiver measures an unacceptable change in channel quality.

The training process rapidly transmits multiple consecutive sounding packets to the receiver, each packet for a different subset of antennas of all of the available antennas. Thus, the receiver can 'learn' or estimate a full complex channel matrix, and select the subset of antennas or beam steering from the channel matrix. Due to the slowly changing nature of the WLAN channel 550, the full channel matrix can be assumed to be substantially unchanged while transmitting the sounding packets.

The inter-packet time interval introduces some distortion on the estimated full channel matrix. Therefore, the interval between the consecutive sounding packets should be relatively short, and the present training scheme is designed based on this requirement.

The receiver performs the antenna/beam selection and feeds back the selected antenna subset or beam steering matrix. This is different for the case when TXBF with explicit feedback is implemented together with transmit antenna/beam selection, as described herein.

Figure 7:
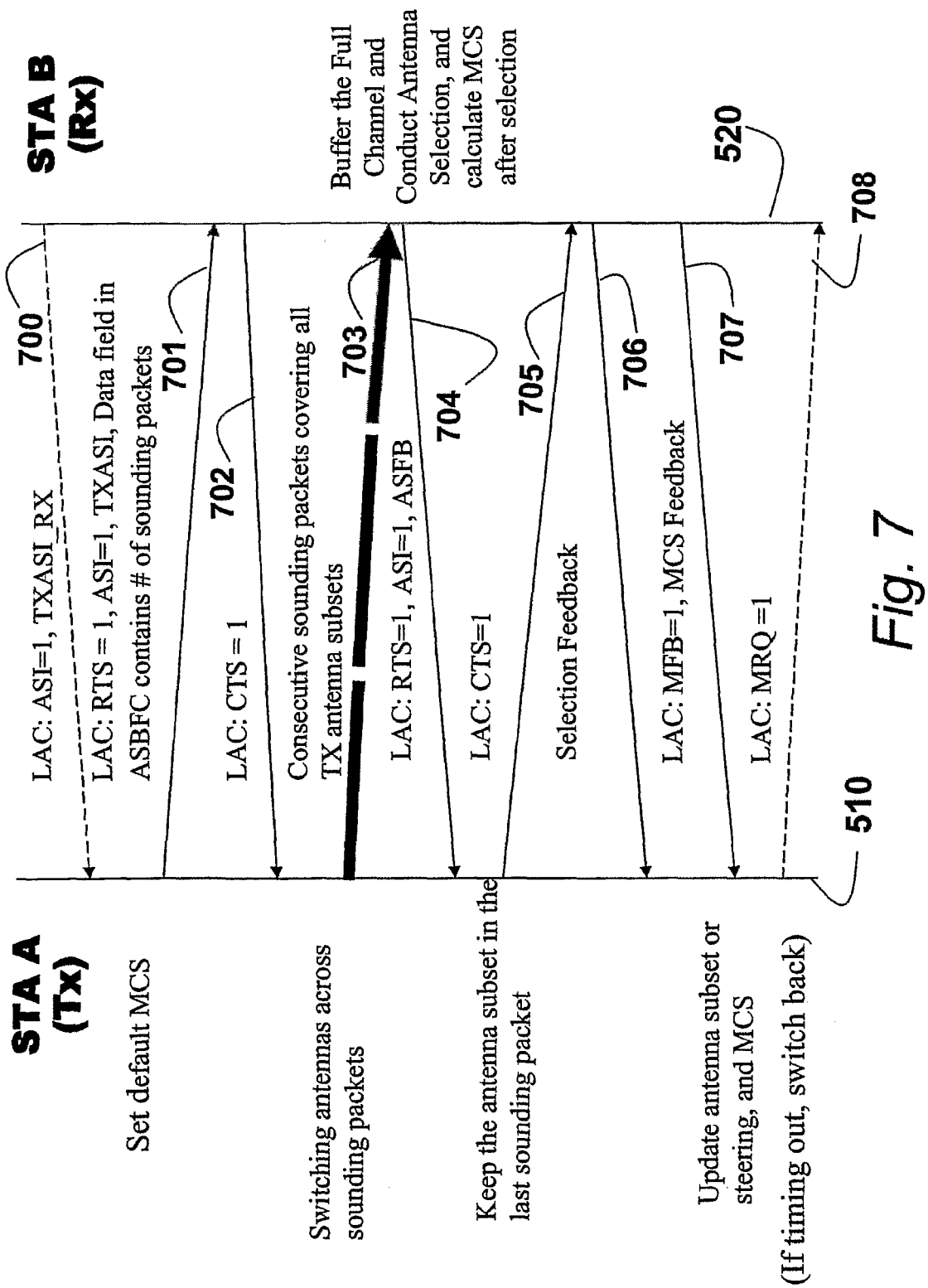
FIG. 7 is a flow diagram of the training for transmit antenna/beam selection according to an embodiment of the invention.

FIG. 7 shows the details of the training method with LAC frame according to an embodiment of the invention. In the following Figures, dotted lines indicate optional transfers. In the optional transfer 700, the receiver (STA B) 520 monitors the channel quality and requests the transmitter (STA A) 510 to initiate the antenna/beam selection training process, by sending a LAC frame with ASI=1 and the command TXAS-I_RX.

Regardless of whether the transmitter receives TXAS-I_RX, the transmitter sets its MCS selection to a reliable one, e.g., default MCS, and then sends a LAC frame 701 with ASI=1 and the command TXASI. The Data part of the field indicates a number of consecutive sounding packets that will be transmitted for training, with RTS=1 in the LAC mask field 120.

Upon receiving the LAC frame, the receiver sends a LAC frame 702 with CTS=1. This indicates that the receiver is ready to receive the sounding packets. Also, when sounding packets are not applied in the system, in this LAC frame, the receiver can set MFB=1 and indicate a suggested MCS set, which utilizes all the available data streams in the MIMO channel, while in each of the streams the most reliable modulation and coding set is deployed.

Upon receiving the LAC frame with CTS=1, the transmitter sends consecutive sounding packets 703 switching to different subsets of antennas for each sounding packet. Note the "fat" line indicates that the packets are transmitted immediately adjacent in time, without any other packets in either direction. Furthermore, as described above, the number of sounding packets, e.g., three as shown, is predetermined and known to both stations before the packets are transmitted. When sounding packets are not applied in the system, the transmitter enforces a MCS set for the same number of consecutive PHY layer training frames, which utilizes all the available data streams in the MIMO channel, while in each data stream the most reliable modulation and coding set is deployed. Therefore, like in a sounding packet, the training information for all the available streams in the MIMO channel is covered by each of these PHY layer training frames. This MCS set can be applied directly by the transmitter, or based on the one suggested by the receiver and indicated in the previously received LAC frame, if there is any. After consecutively sending out all the training frames, the transmitter then may switch back to the previous MCS set for transmitting LAC frames. Note, the process without applying sounding packets is not depicted in FIG. 7, and in the following text, for the ease of illustration, the term "sounding packet" is used to represent both cases.

The receiver estimates the full channel matrix from the received sounding packets, and performs the antenna/beam selection accordingly. The appropriate MCS set is determined based on the selected antennas result.

After the antenna selection, the receiver sends a LAC frame 704 with RTS=1, ASI=1 and the command ASFB in the field ASBFC 600.

Using the antenna subset used for sending the last sounding packet, the transmitter sends a LAC frame 705 with CTS=1, when the transmitter is ready to receive the antenna/beam selection feedback.

The receiver sends back a packet 706 containing the selection results.

The receiver sends back a LAC frame 707 with MFB=1, and the ASBFC field 600 contains the selected MCS set number.

The transmitter updates its selected antenna subset or beam steering correspondingly, and applies the new MCS set.

If the transmitter does not receive the ASFB after a predetermined time, the transmitter reverts to the previously selection or the default setting, and sends a LAC frame 708 with MRQ=1 to initiate a new MCS training cycle.

Based on the design of the WLAN PHY layer, the signaling and training preamble of the PHY layer packets are protected much better than a regular data field in which the MCS set is applied. Thus, even if one sounding packet for selection training is erroneously detected, its preamble can still be accurately decoded. Therefore, antenna selection training is not influenced.

For transmitting data packets, the transmitter waits for a short ACK packet, defined at the MAC layer, before transmitting the next data packet. Otherwise, timing out, the transmitter retransmits the previous data packet. While transmitting sounding packets with data for antenna/beam selection training, the transmitter switches to different antenna subsets for each consecutive sounding packet, even though the transmitter may not receive an ACK in response to sending each sounding packet.

The retransmission of 'lost' data in the sounding packets does not increase the number of sounding packets. The lost data retransmitted in the next available packet, no matter whether the packet is a sounding or a conventional packet. In another word, the antenna/beam selection training process is in parallel with the process of transmitting data using the sounding packets. The two processes are independent of each other. In an alternative implementation, it can be required that the data are retransmitted from the same antenna set, but possibly with a different MCS).

If a sounding packet is received erroneously but the preamble is received correctly, then the receiver still buffers the corresponding channel matrix for antenna/beam selection. However, an ACK is not replied to the erroneously received sounding packet.

If a sounding packet (including its preamble) is erroneously detected or totally lost, the receiver knows that this antenna/beam selection training process has failed, and the receiver terminates the selection process. After a pre-defined time interval, if the transmitter does not receive the ASBF command from the receiver, then the transmitter switches back to the previously selected or default antenna subset or beam steering, and the transmitter sends a LAC frame with MRQ=1 to renew the MCS setting.

To improve the efficiency and reliability of the training process, the time interval between the consecutive sounding packets should be relatively short. Therefore, the amount of data transmitted in the sounding packets should be relatively small. The determination of the length of data packet is beyond the functionality of MAC layer. However, a function block may determine the length of the data to be transmitted, taking into account the required overhead of a sounding packet, as well as the MCS scheme on the different channels, so that the total net throughput is optimized.

If the sounding packets contain no data, which is an alternative option, then the channel estimation is most accurate, and the time required for the whole training process is reduced. Therefore, there is a tradeoff problem between efficiency and performance.

In the case that sounding packets are not allowable and the alternative PHY training frame (packet) with the enforced MCS set is applied for training (as described above), when the number of RF chains at the transmitter is larger than the maximum number of data streams provided by the MIMO channel, i.e., the channel rank, if data are transmitted with the PHY layer training packet, each data stream should contain the independent training sequences with a number equal to the channel rank. If the training packets contain no data, the number should equal to the number of RF chains of the transmitter, so that the required number of training packets is reduced correspondingly. This is another potential advantage of not including data in the training packets.

The transmitter knows the ordering of antennas in the subsets of the different sounding packets, while the receiver simply numbers the antenna indexes by the order of the arriving sounding packets. Therefore, the transmitter can translate the antenna selection feedback, and select 540 the corresponding subset of antennas.

The formatting and queuing of the selection feedback packet can vary based on different antenna/beam selection processes. One example is, when selecting $N_{A\_SS}$ antennas/beams from $N_A$ antennas, one $N_A \times N_{A\_SS}$ matrix $F_A$ is fed back. For pure antenna selection, $F_A$ contains only 0 and 1 which is a permutation of $N_{A\_SS}$ columns of the $N_A \times N_A$ identity matrix; while for RF beam steering, $F_A$ contains phase shift factors.

ASI 127 and MFB 125 bits in LAC Mask field 120 cannot be set to 1 simultaneously. On the forward link (from STA A to STA B in FIG. 7), because the training process does not require any MCS updating before the new selection result is set, there is no influence if the constraint MFB=0 is applied. On the reverse link, because MCS feedback can only be sent from STA A to STA B whenever ASI=0, there is a possibility that an MFB is delayed by the antenna/beam selection training process. On the other hand, if the updated antenna subset or RF steering at STA A is also applied on the reverse link, it is unnecessary to do MCS updating on the reverse link before finishing the entire training process. Generally speaking, this potential conflict problem between ASI and MFB does not impact on the system.

The extension to training using the HT control field is straightforward. In FIG. 7 "LAC" may be replaced by "HT Control Field"; and "ASI=1" may be replaced by "MRS=11" or "ASI=1" for the case that ASI is used to indicate a reuse of the MFB field.

Receive Antenna/Beam Selection Training Process

Figure 8:
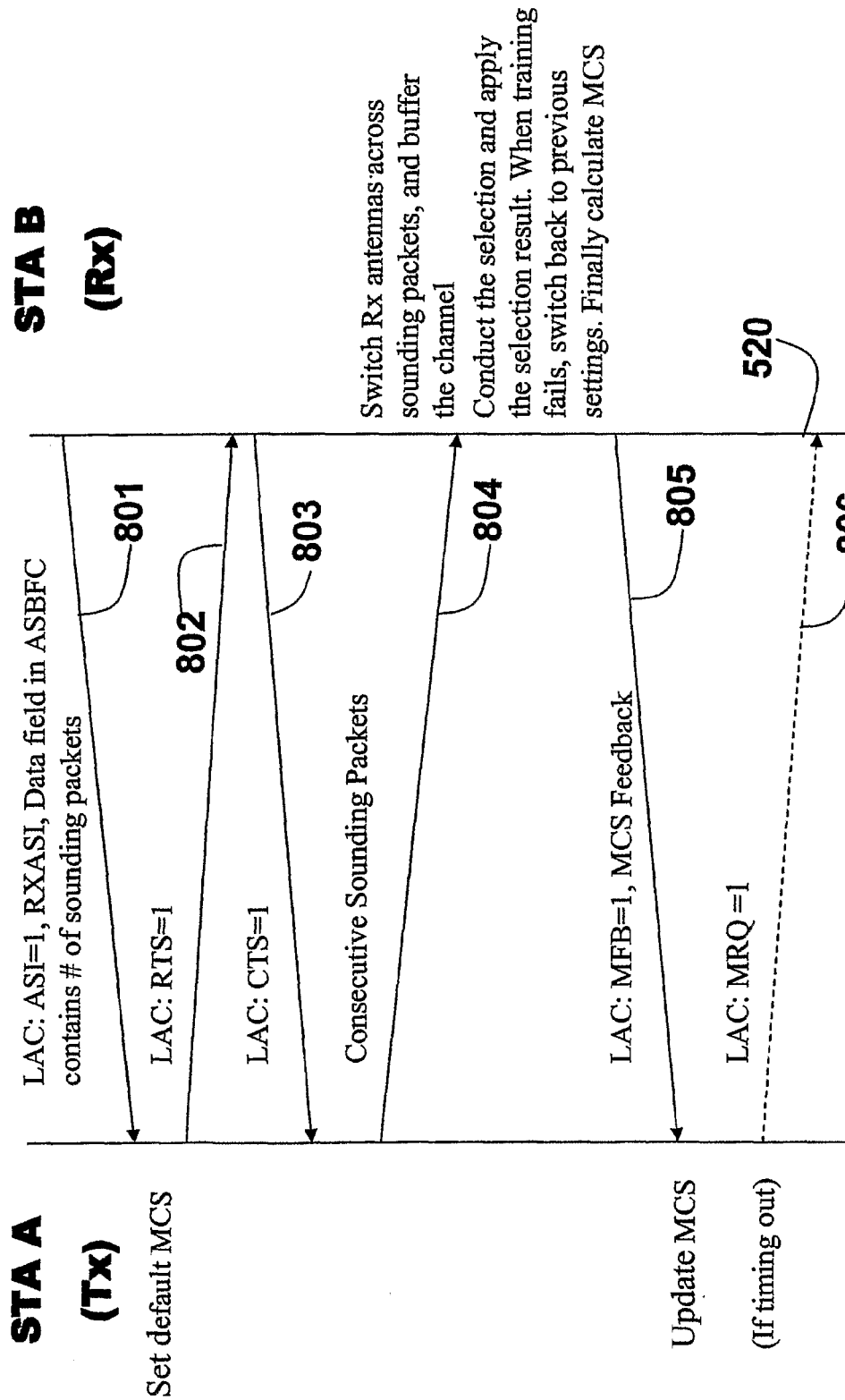
FIG. 8 is a flow diagram of the training for receive antenna/beam selection according to an embodiment of the invention.

FIG. 8 shows a receive antenna/beam selection training process with LAC frame initiated by the receiver. The receiver receives multiple sounding packets from the transmitter, and switches its RF chains to different antenna subsets on receiving the different sounding packets. This enables the receiver to estimate the entire channel matrix and perform antenna/beam selection.

The receiver 520 sends a LAC frame 801 with ASI=1, the command RXASI, and the data part in the ASBFC field containing the required number of sounding packets.

Similar to the approach used in transmit selection training, for protecting LAC frames and the data in the sounding packets (if there are any) from mismatched MCS sets, the transmitter resets MCS upon receiving the RXASI command. Similarly, for the case where sounding packet cannot be applied, the transmitter enforces a MCS set for the consecutive PHY layer training frames, which utilizes all the available data streams in the MIMO channel, while in each data stream, the most reliable modulation and coding set is deployed. This process is not depicted in FIG. 8, and the term "sounding packet" is used to represent both cases.

Upon receiving the first RXASI command, the transmitter 510 sends a LAC frame 802 with RTS=1, and the receiver responds with a LAC frame 803 with CTS=1, and the transmitter sends the sounding packets 804.

At the receiver, when the preamble in the sounding packets is correctly detected, even if the data are not, the receiver continuously estimates the channel to conduct antenna/beam selection, but no ACK is sent back if the data field is not detected correctly.

If a sounding packet (including its preamble) is lost, the receiver switches back to the previous antenna subset or steering setting, and does the corresponding MCS determination.

Data lost in any sounding packet is retransmitted in a later packet.

Then, the receiver sends a LAC frame 805 with MFB=1, and the MCS feedback indicating the selection.

Upon receiving the first RXASI command, the transmitter starts a clock. If no MCS feedback 805 is received after a time out threshold, which means that the current training process probably failed, the transmitter sends a LAC frame 806 with MRQ=1 to renew the MCS setting.

Other concerns, such as the data length (or no data) in the sounding packets, the number of independent training sequences, and the confliction of MFB and ASI, can be addressed similarly to the approach taken in the transmitter antenna/beam selection case.

The extension to training using the HT control field is straightforward. In FIG. 8 "LAC" may be replaced by "HT Control Field"; and "ASI=1" may be replaced by "MRS=111" or "ASI=1" for the case that ASI is used to indicate a reuse of the MFB field.

Receiver Initiated Transmit Beam Forming

As described above, only the transmitter can initiate TXBF training in the prior art. Because the receiver can always monitor the steered channel quality, e.g., the orthogonality among the steered column vectors in MIMO channel matrix in eigen beam forming schemes, it may be more efficient for the receiver to initiate the TXBF training, whenever the receiver detects an unacceptable steering.

The method as described herein can perform receiver initiated training, by using the command TXBFI_RX.

Figure 9:
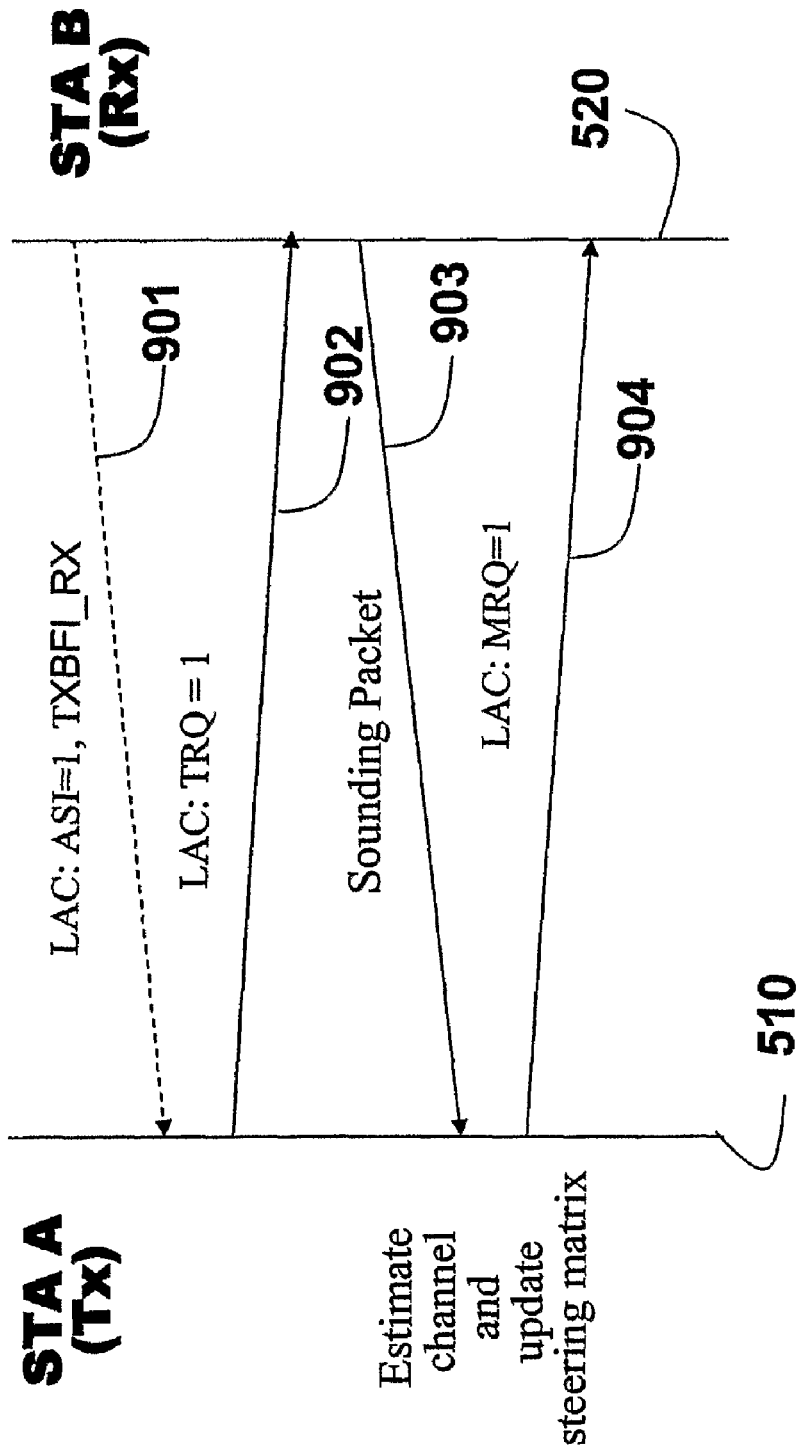
FIG. 9 is a flow diagram of receiver initiated beam forming training according to an embodiment of the invention.

FIG. 9 shows the TXBF training process initiated by the receiver with a LAC frame. The training process assumes that the RTS/CTS exchange has been completed.

Figure 1:
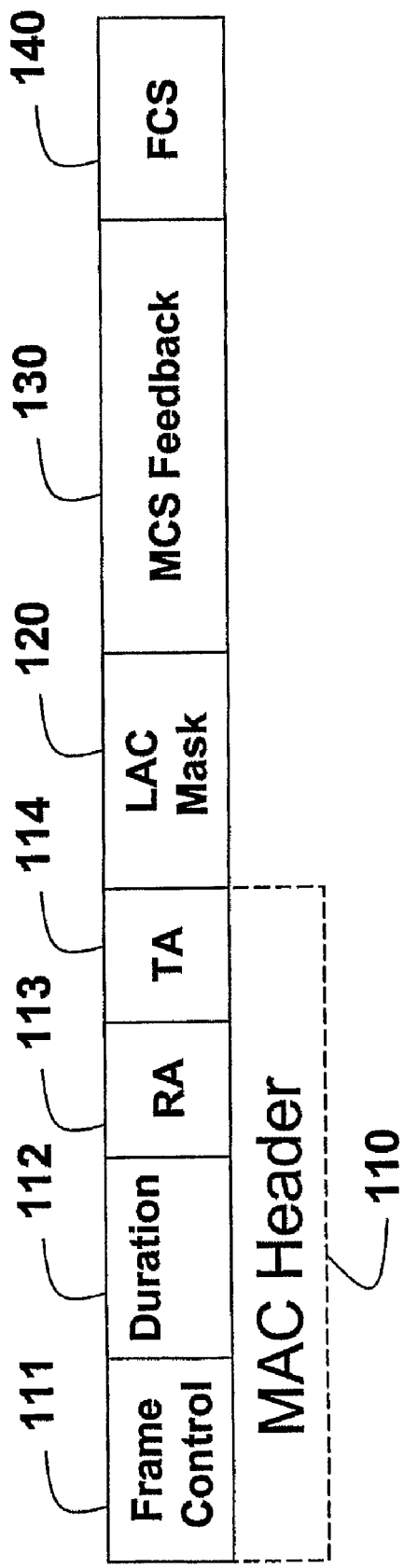
FIG. 1 is block diagram of a prior art LAC frame.
Figure 2:
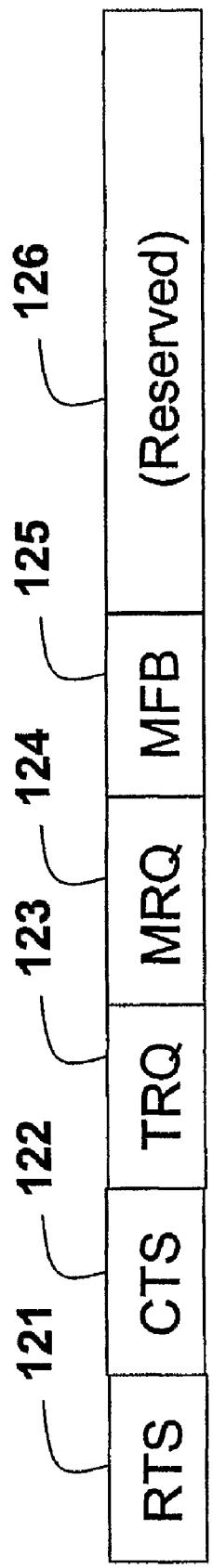
FIG. 2 is a block diagram of a prior art LAC mask field.
Figure 3:
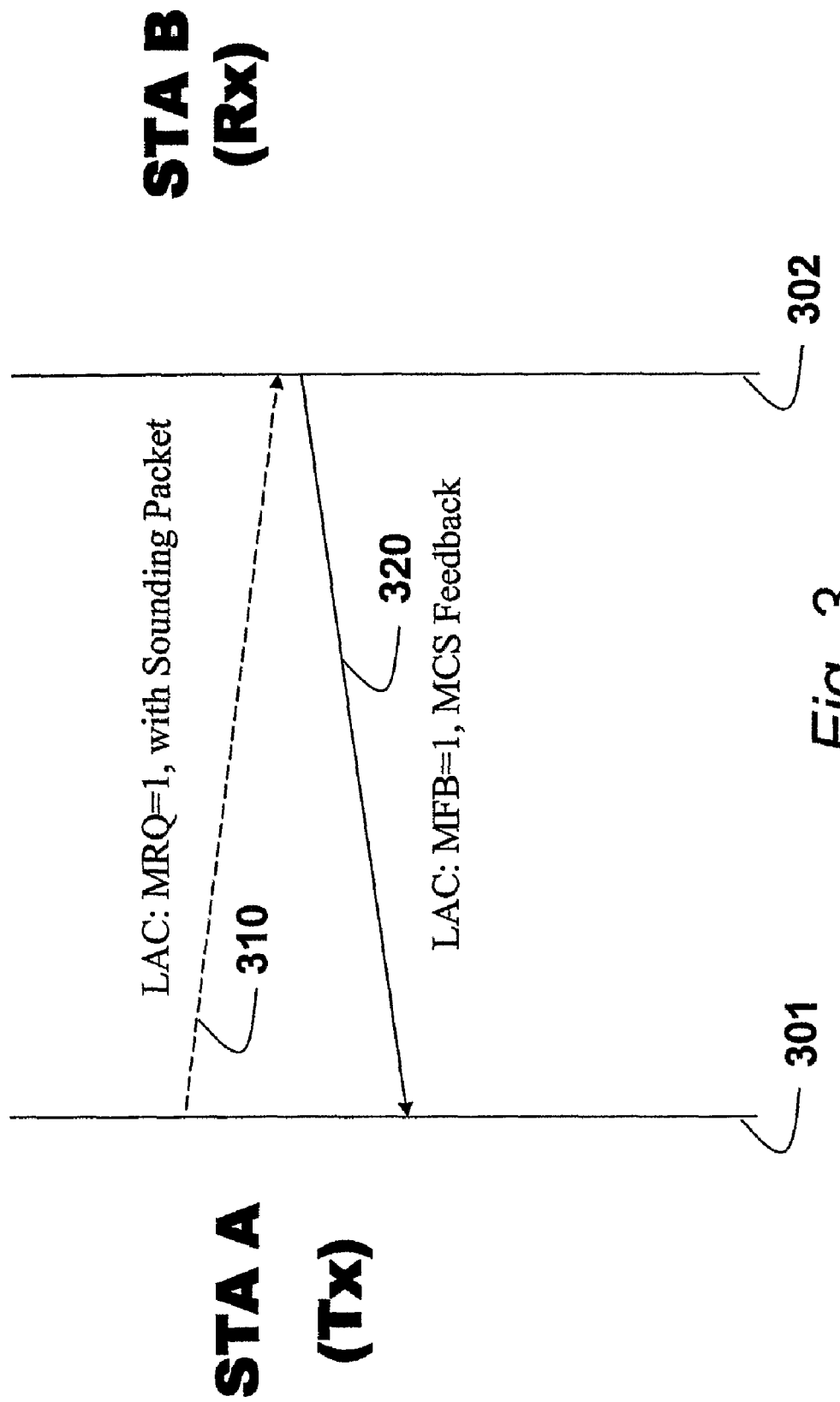
FIG. 3 is a flow diagram of a prior art MCS training process.
Figure 4:
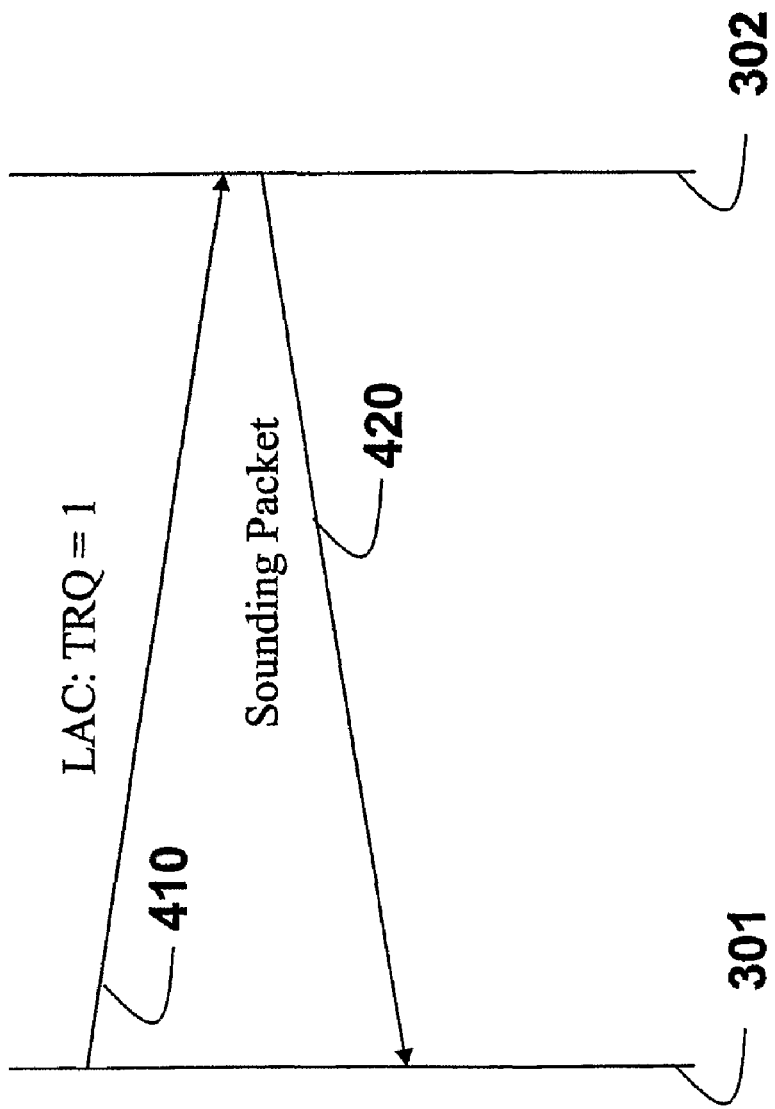
FIG. 4 is a flow diagram of a prior art TXBF training process.

The receiver sends a LAC frame 901 with ASI=1, and command TXBFI_RX. The transmitter responds with a LAC frame 902, with TRQ=1, or directly sends TRQ as in the conventional scheme in FIG. 4. The receiver sends one sounding packet 903. The transmitter estimates the channel, updates the steering matrix, and finally replies with a LAC frame 904 with MRQ=1, to initiate a new MCS training cycle.

The extension to training using the HT control field is straightforward. In FIG. 9 "LAC" may be replaced by "HT Control Field"; and "ASI=1" may be replaced by "MRS=111" or "ASI=1" for the case that ASI is used to indicate a reuse of the MFB field.

Antenna/Beam Selection Combining with TXBF

As described above, transmit beam forming (TXBF) is another effective close-loop MIMO scheme that increases throughput and reliability of the system. Therefore, it is desired to combine antenna/beam selection with TXBF. Note that the antenna/beam selection training process requires explicit feedback of the selection result, which is usually one matrix, while TXBF can require either explicit feedback of the channel matrices of all the subcarriers in an MIMO-OFDM system applied in high-throughput WLANs, or implicit feedback, where the transmitter can update its beam forming steering matrix based on what the transmitter estimates from the reverse link, assuming the channels on the forward and reverse links are reciprocal. A calibration process, which typically happens only upon associations, is then required for the enforcement of the reciprocity assumption, which needs to be addressed when combining with antenna/beam selections. When explicit feedback is used for TXBF training, it is possible to combine antenna/beam selection with TXBF. Furthermore, because the entire channel matrix can be fed back from the receiver to the transmitter, there is no need for a separate TXBF training. For transmit antenna/beam selection, the transmitter can calculate its selections (instead of at the receiver as in FIG. 7), the beam forming matrices, and the corresponding MCS set, all based on the feedback values. For receiver selections, the selection is determined and applied at the receiver while the beam forming matrices are performed at the transmitter.

As an alternative implementation, it is also possible to perform antenna selection and TXBF as separate operations, where the selection process is performed as described in the previous sections, while the TXBF is done using an implicit feedback scheme (as described, e.g., in the TGnSync draft specifications), possibly at different intervals compared to the antenna selection.

When implicit feedback is used for TXBF training, it is also possible for the receiver to perform antenna/beam selection without any significant modification on the training process, because the transmitter side calibration is sufficient for performing TXBF training.

Figure 10:
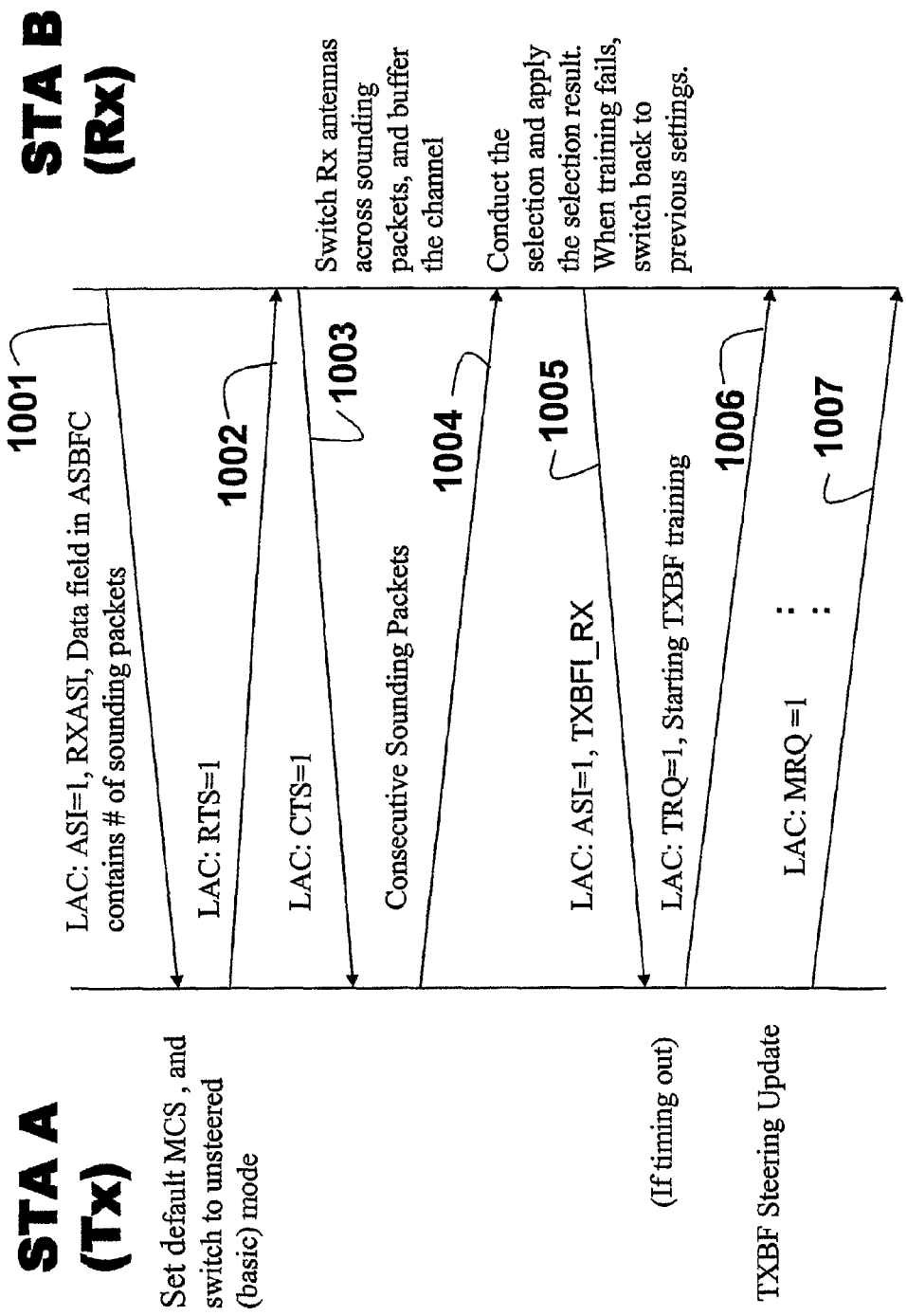
FIG. 10 is a flow diagram of combined receive antenna/beam selection and TXBF training according to an embodiment of the invention.

The training process in FIG. 8 is then correspondingly modified as shown in FIG. 10. The receiver sends a LAC frame 1001 with ASI=1, and command RXASI. The transmitter sets the default MCS, switches to unsteered or basic MIMO mode, and replies with a LAC frame 1002 with RTS=1. The receiver responds with a LAC frame 1003 with CTS=1, which causes the transmitter to send the sounding packets 1004. The receiver performs channel estimation and antenna/beam selection, and responds with a LAC frame 1005 with ASI=1, and command TXBFI_RX, which initiates a TXBF training process. Upon receiving TXBFI_RX or after a predetermined time out threshold, the transmitter sends a LAC frame 1006 with TRQ=1 to start TXBF training. After updating the TXBF steering matrices, the transmitter sends a LAC frame 1007 with MRQ=1 to initiate a new MCS training cycle.

Note, the receiver only selects antennas without determining the corresponding MCS, and after updating the selection result, the transmitter initiates the TXBF and MCS training processes subsequently.

Finally, with implicit feedback used for TXBF training, if the selection is performed at the transmitter, then both the calibration process and antenna/beam selection training process is modified correspondingly.

For example, there are $$N_S = \binom{N_A}{N_{A\_SS}}$$

possible antenna subsets at the transmitter STA A, for calibration. The transmitter switches the RF chains to the first subset of antennas and conducts the calibration process. The transmitter then switches the RF chains to the next antenna subset and conducts calibration. This process is repeated until all subsets have been calibrated. The transmitter stores the corresponding calibration correction matrices $K_1 \sim K_{N_S}$ for further use.

During a normal transmission mode, if the antenna subset l∈[1, $N_S$] is used for transmission, then the corresponding calibration matrix $K_l$ is applied at the transmitter RF chains. During antenna selection, the transmitter switches to a new calibration matrix whenever the antenna subset is updated.

Figure 11:
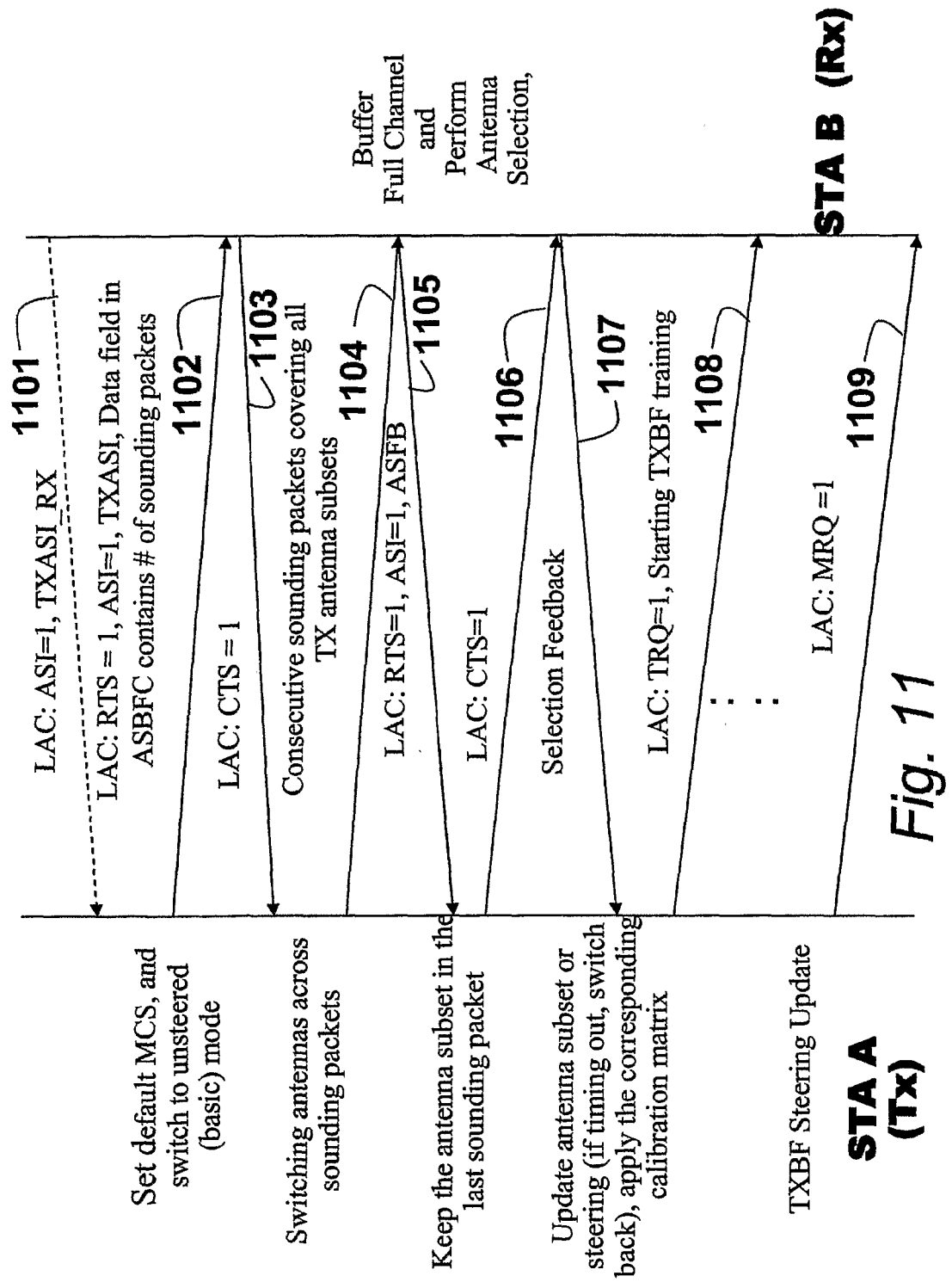
FIG. 11 is a flow diagram of combined transmit antenna/beam selection and TXBF training according to an embodiment of the invention.

FIG. 11 shows the corresponding training process. The receiver sends a LAC frame 1101 with ASI=1, and command TXASI_RX (this step is optional as in FIG. 7). The transmitter sets the default MCS, switches to unsteered or basic MIMO mode, and replies with a LAC frame 1102 with ASI=1, and the number of packets in the data part of ASBFC field. The receiver responds with a LAC frame 1103 with CTS=1, which causes the transmitter to send the sounding packets 1104. The receiver performs channel estimation and antenna/beam selection, and responds with a LAC frame 1105 indicating the completion of selection with RTS=1 as described above. The transmitter retains the antenna subset corresponding to the last sounding packet, and responds with a LAC frame 1106 with CTS=1. The receiver feeds back the selection result 1107. This causes the transmitter to update the antenna subset or the steering, and apply the corresponding calibration matrix. Then, the transmitter sends a LAC frame 1108 with TRQ=1 to start TXBF training. Lastly, after updating the TXBF beam steering, the transmitter sends a LAC frame 1109 with MRQ=1 to initiate a new MCS training cycle.

The extension to training using the HT control field is straightforward. In FIG. 11 "LAC" may be replaced by "HT Control Field"; and "ASI=1" may be replaced by "MRS=111" or "ASI=1" for the case that ASI is used to indicate a reuse of the MFB field.

Variations

The above described methods can also be applied to the cases where the system is frequency-selective, such as OFDM systems according to the IEEE 802.11n standard, because both pure antenna selection and beam selection can be implemented, regardless of frequency. RF-baseband processing has the advantage because the performance gain is independent of frequency-selectivity, while the gain by pure antenna selection tends to be averaged out by frequency-selectivity.

The embodiments described herein use the LAC frame and a HT Control Field. The invention can be used for any similarly defined signaling frame in a MAC layer that allows a fast communication between the transmitter and receiver, in which one bit or bit combination is used to indicating an antenna/beam selection training frame, and any suitable field with a length of at least 7 bits in the control frame can be used for exchanging the selection training information. This field can either be a reused field from the one used for MCS feedback, or a newly defined field dedicated only for antenna/beam selection training. In the latter case, the restriction in simultaneous antenna/beam selection training and MCS feedback is not required.

When both the transmitter and the receiver have antenna/beam selection capability, the training process can alternate on both sides with marginal performance degradation, compared with selecting on both side simultaneously. Yet another alternative would be to increase the number of training packets, making sure that the total number of spatial streams (taken over all training packets) is sufficient for a complete training of the packet.

Yet another alternative is the transmission of dummy data, i.e., data that do not carry useful information, but rather are values that make sure that the transmit signal during the data transmission has the form of a training field, known at the receiver.

Alternating Sounding and Reply Packets

Figure 13:
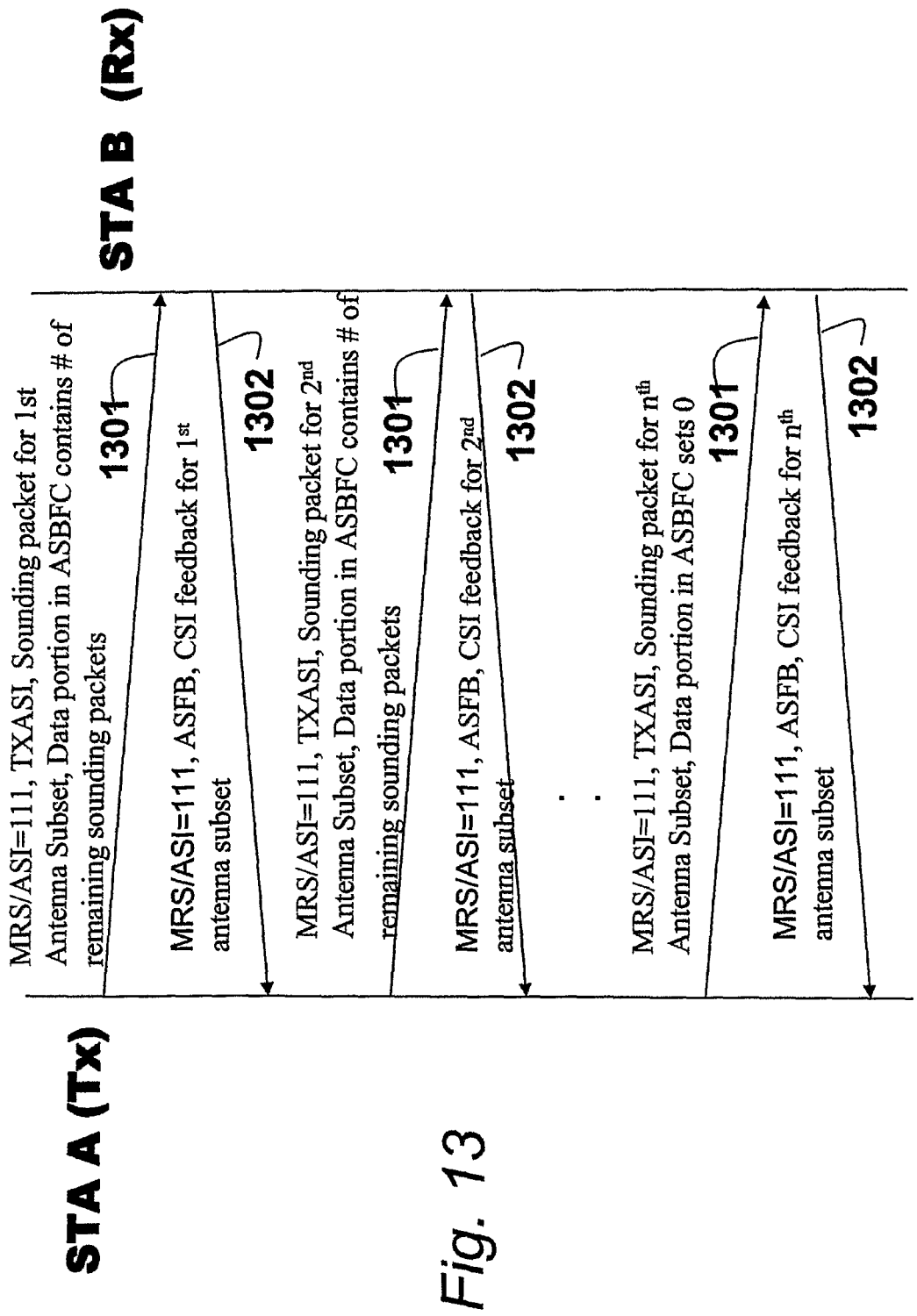
FIG. 13 is a flow diagram of antenna/beam selection training according to another embodiment of the invention.

FIG. 13 shows another embodiment of the invention, regarding the transmit antenna/beam selection training using signaling by an HT control field or other MAC signaling. The basic idea is that the transmitter transmits multiple sounding packets 1301, each of which contains an HT control field in the MAC frame as described above Information about the antenna selection is included in the HT control field (or similar) that is sent with each of the sounding packets. In the following, we describe one (of many possible) particular implementations.

One sounding packet is transmitted for each subset of antennas. In each of the sounding packets, MRS/ASI 1230 is set to 111, the command portion 610 in MFB/ASBFC field 1250 is set to TXASI, and data portion 620 of MFB/ASBFC field 1250 of HT Control field 1200 is used to indicate the remaining number of sounding packets to be sent. Alternatively, the control field can also just indicate that a sounding packet is the first (last) of a sequence of sounding packets intended for antenna selection The receiver feeds back a packet 1302 containing CSI for each corresponding sounding packet 1301 as the sounding packet is received. Alternatively (or additionally), it can feed back the information about which antennas should be used in the future; this feedback should occur after the last sounding packet has been received.

Figure 14:
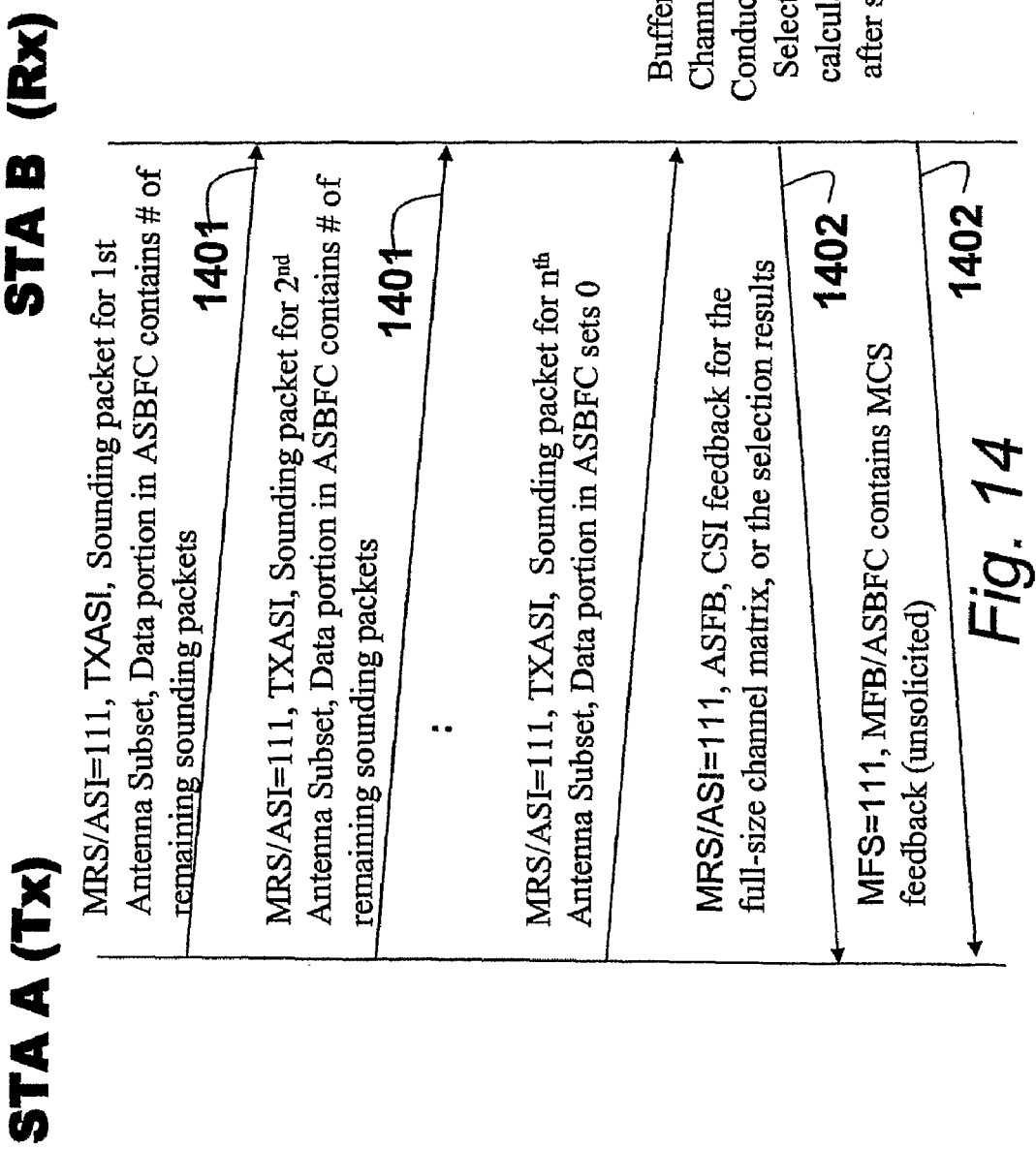
FIG. 14 is another flow diagram of antenna/beam selection training according to an embodiment of the invention.

As shown in FIG. 14, the receiver can also elect to reply 1402 to each of the sounding packets 1401 after all sounding packets are received Regarding the feedback structure, if explicit partial CSI, explicit full-size CSI, and antenna selection results are all possible to be applied, more signaling may be required to differentiate the selection. One possible solution is to utilize the reserved commands in the command portion 610 of the MFB/ASBFC field 1250. Another way uses use the data portion 620 of MFB/ASBFC field 1250, when the command portion 610 is set to ASFB, so the data portion 610 is not used to indicate the number of sounding packets. Also, feedback structures already defined for other purposes might be used.

Similarly, if different training protocols as shown in FIGS. 7, 13, and 14 coexist, extended command portion 610 may be required to differentiate the protocols. The large number of reserved commands guarantees the possibility of the above extensions.

Alternating Signaling and Training Process Using Two Categories of Sounding Packets An alternative way of defining the ASC field in FIG. 12, in which 3 bits are used for command subfield and 4 bits are used for data subfield, is shown in Table B:

TABLE B

| Command | Meaning of Command | Data |
| --- | --- | --- |
| 000 | Transmit Antenna Selection Sounding Indication (TXASSI) | Number of remaining sounding frames ('0000'-'1111') |
| 001 | Transmit Antenna Selection Sounding Request (TXASSR) | Reserved |
| 010 | Receive Antenna Selection Sounding Indication (RXASSI) | Number of remaining sounding frames ('0000'-'1111') |
| 011 | Receive Antenna Selection Sounding Request (RXASSR) | Total number sounding frames required ('0000'-'1111') |
| 100 | Sounding Label | Sequence number of the sounding frame corresponding to a CSI Matrices frame in AS feedback ('0000'-'1111') |
| 101 | No feedback, AS training failure | Reserved |
| 110-111 | Reserved | Reserved |

In the Transmit/Receive Antenna Selection Sounding Indication commands, if regular sounding packets are used, the value in the data field is interpreted as the remaining number of sounding packets following the current one. If ZLF sounding frames are used, the value in the data field is the number of ZLFs following a non ZLF +HTC.

Figure 15:
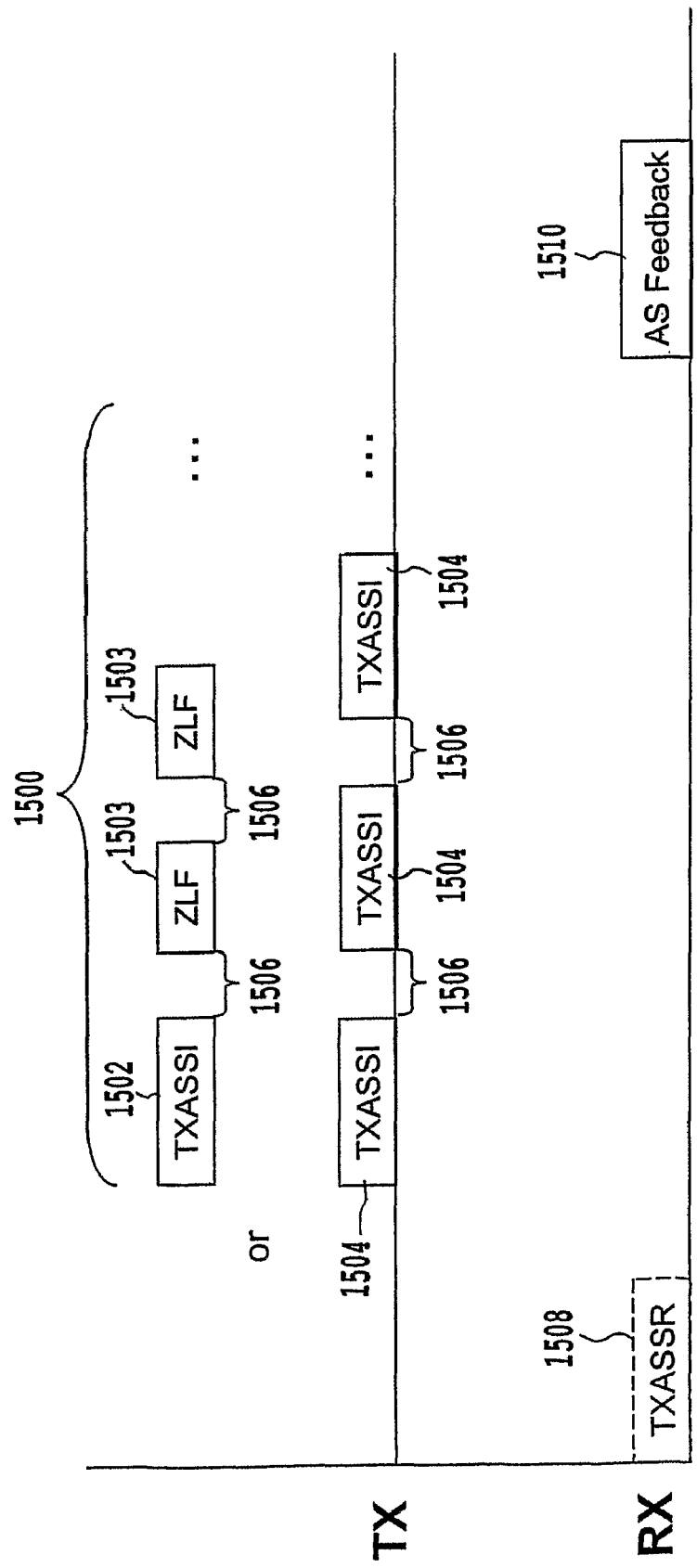
FIG. 15 is a signal timing diagram of antenna/beam selection training according to an embodiment of the invention.

FIG. 15 is a signal timing diagram of examples of transmit antenna training frame exchanges with the two categories of sounding packets, and based on the alternative definition of ASC subfield in Table B. In the examples of FIG. 15, the consecutive sounding packets, either regular 1504 or ZLF 1503, are separated by SIFS 1506 and sent within one transmit opportunity (TXOP) 1500 as defined in the MAC layer. When using regular sounding packets 1504, each of the sounding packets contains a HT control field. Then, the training process is similar to that in FIG. 7 and in FIG. 14. When using ZLFs 1503 as sounding packets, the +HTC frame right before the ZLF(s) 1502 should signal TXASSI, set the ZLF bit (as in FIG. 12, to indicate the subsequent ZLF(s)), and indicate the number of subsequent ZLF(s), as described in Table B. This non-ZLF +HTC frame 1502 may also be a regular sounding packet. Further, an optional packet 1508 including the TXASSR signal may be sent by the receiver to request the training. In addition, a packet 1510 including AS Feedback may be sent by the receiver after the receiver conducts channel estimation.

When regular sounding packet(s) and ZLF(s) are jointly used for antenna selection training, the regular sounding packet (with TXASSI) 1502 right before a ZLF 1506 or consecutive ZLFs may set its ZLF bit. Another option is to insert a regular +HTC frame, which may not be a sounding packet, between the previous regular sounding packet and the subsequent ZLF(s), and this frame should signal TXASSI, set the ZLF bit, and indicate the number of subsequent ZLF(s).

Figure 16:
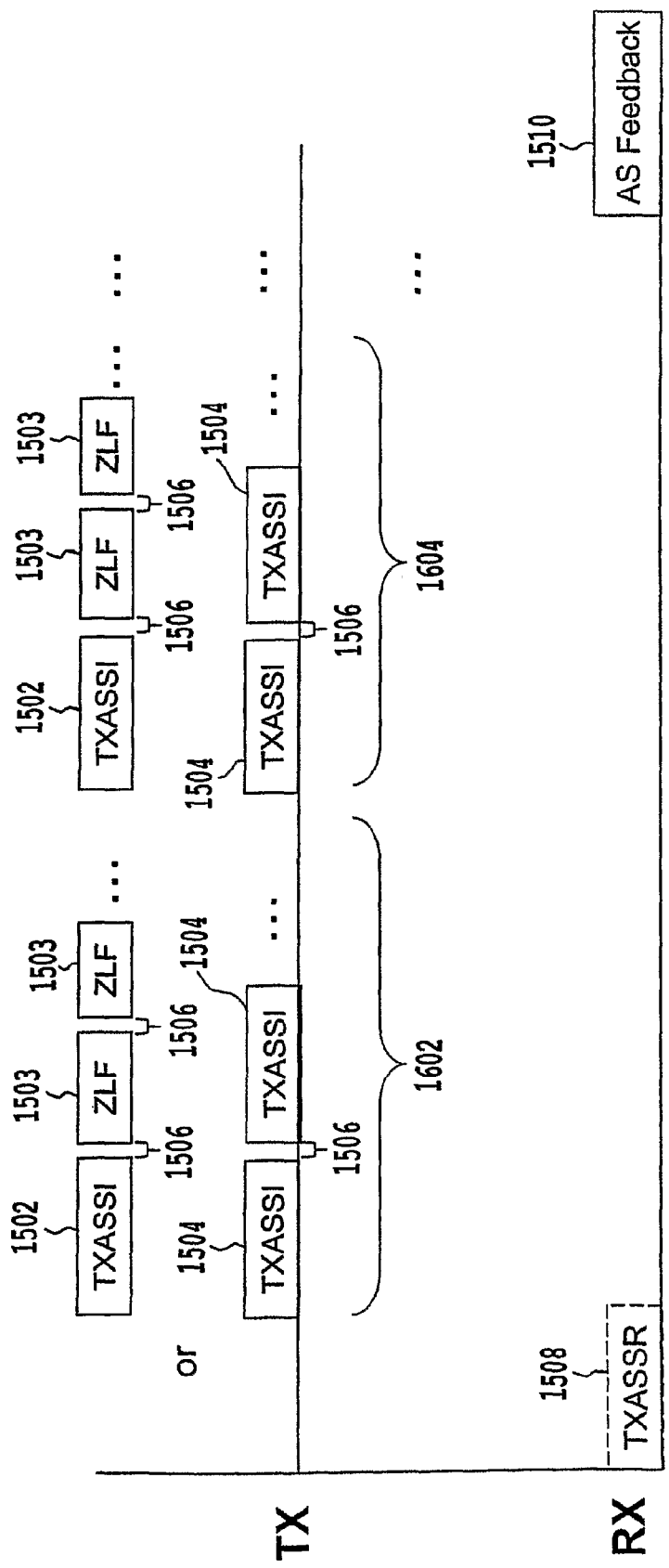
FIG. 16 is another signal timing diagram of antenna/beam selection training according to another embodiment of the invention.

FIG. 16 is a signal timing diagram showing examples of transmit training frame exchanges when the consecutive sounding packets cannot be sent in one TXOP. If ZLF is used for antenna selection training, one non-ZLF +HTC frame 1502 may be sent at the beginning of each TXOP 1602/1604. The non-ZLF +HTC frame 1502 may be a regular sounding packet. When regular sounding packet(s) 1504 and ZLF(s) 1503 are jointly used for antenna selection training in this case, any ZLF or consecutive ZLFs should follow a non-ZLF +HTC frame 1502 with ZLF bit set and TXASSI set, in the same TXOP, i.e. no ZLF is allowed to transmit at the beginning of any TXOP.

Figure 17:
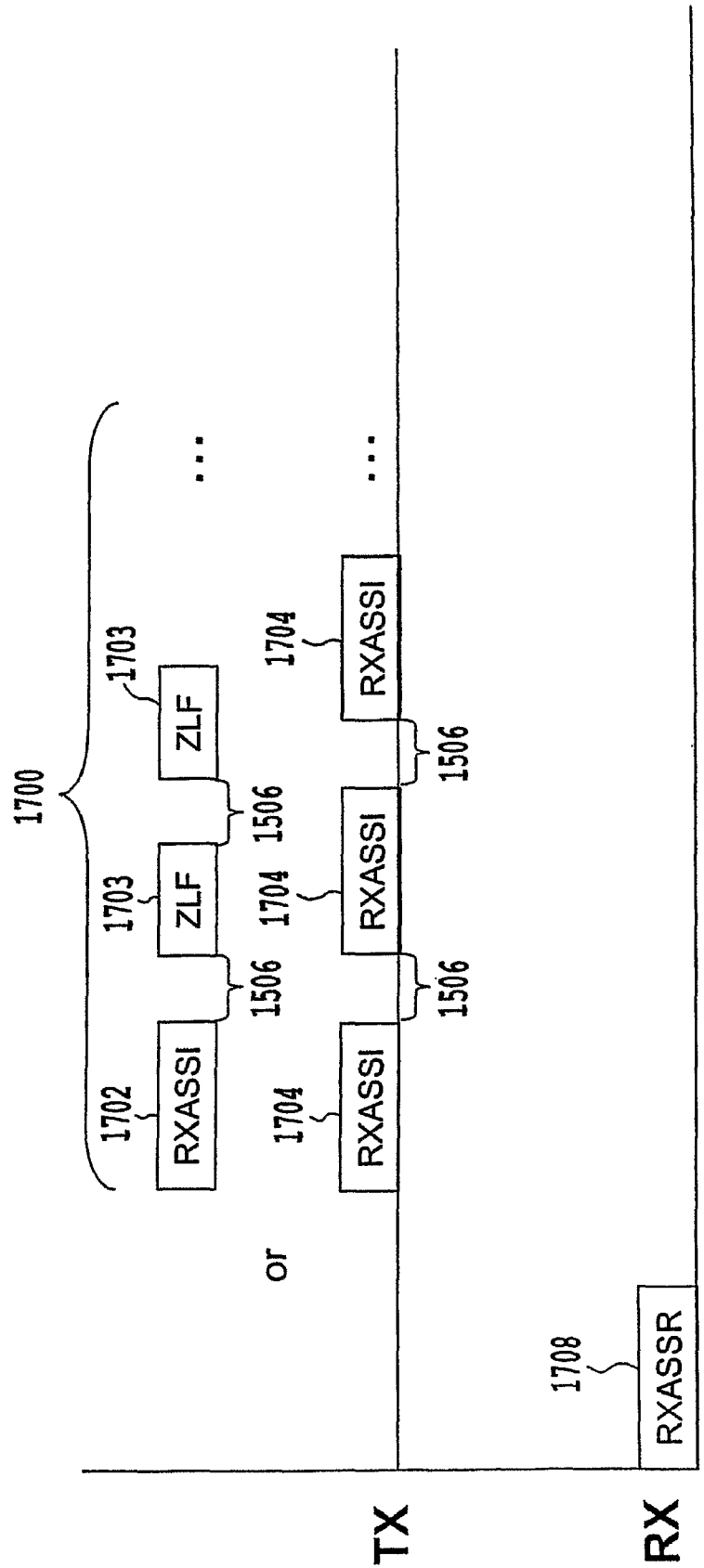
FIG. 17 is another signal diagram of antenna/beam selection training according to another embodiment of the invention.

FIG. 17 is a signal timing diagram showing examples of receive training frame exchanges with the two categories of sounding packets, and based on the alternative definition of ASC subfield in Table B. In the examples of FIG. 17, the consecutive sounding packets, either regular 1704 or ZLF 1703, are sent in one TXOP 1700. When using regular sounding packets 1704, each of the sounding packets contains a HT control field. In this case, the training process is similar to that in FIG. 8. When using ZLFs as sounding packets, the +HTC frame 1702 right before the ZLF(s) should signal RXASSI, setting the ZLF bit, and indicate the number of subsequent ZLF(s). This non-ZLF +HTC frame 1702 may be a regular sounding packet. In this example, a packet 1708 including the signal RXASSR is sent from the receiver to request the estimating.

When regular sounding packet(s) and ZLF(s) are jointly used for antenna selection training, the regular sounding packet (with RXASSI) 1702 before ZLF(s) 1703 may set the ZLF bit. Another option is to insert a regular +HTC frame, which may not be a sounding packet, between the previous regular sounding packet and the subsequent ZLF(s), and this frame should signal RXASSI, set ZLF bit, and indicate the number of subsequent ZLF(s).

Figure 18:
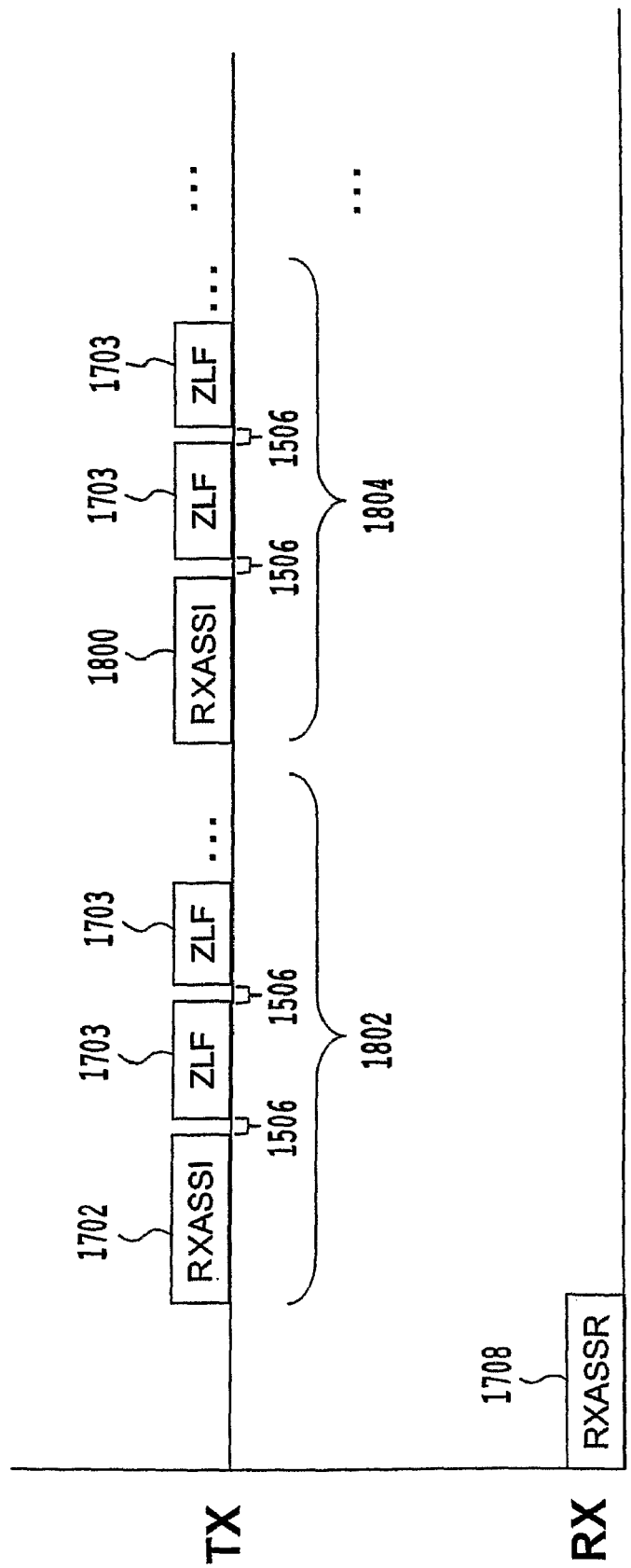
FIG. 18 is another signal timing diagram of antenna/beam selection training according to another embodiment of the invention.

FIG. 18 is a signal timing diagram showing an example of a receive training frame exchange in multiple TXOPs 1802/1804 using ZLF sounding packets 1703. In the case that the consecutive sounding packets cannot be sent in one TXOP, after the first TXOP 1802, the transmitter must send a regular non-ZLF +HTC frame 1800 at the beginning of each subsequent TXOP. The regular non-ZLF +HTC frame 1800 cannot be used as sounding packet for antenna selection training, because the receiver may not know bow to switch its receive antenna elements at the beginning of each TXOP. When followed by regular sounding packet(s), this non-ZLF +HTC frame should signal RXASSI, and indicate the number of remaining sounding packets. When followed by ZLF(s) 1703, the frame 1800 should signal RXASSI, set ZLF bit, and indicate the number of subsequent ZLFs. The above rules also apply when regular sounding packet(s) and ZLF(s) are jointly used for receiver antenna selection training.

The present invention includes processing of signals input to one or more subsystems of the subject invention, and programs by which such signals are processed. Such programs are typically stored and executed by a processor implemented in VLSI. The processor typically includes or operates in conjunction with a processor storage product, i.e., an electronic storage medium, for storing program instructions containing data structures, tables, records, etc. Examples of storage media are electronic memories including PROMs (EPROM, EEPROM, flash EPROM), DRAM, SRAM, SDRAM, FRAM, or any other magnetic medium, or any other medium from which a processor can read, for example compact discs, hard disks, floppy disks, tape, magneto-optical disks.

The electronic storage medium according to one embodiment of the invention may include one or a combination of processor readable media, to store software employing computer code devices for controlling the processor. The processor code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for selecting antennas in a multiple-input, multiple-output (MIMO) wireless local area network (WLAN) including a plurality of stations, each station including a set of antennas, said method comprising steps of:
   receiving, via a channel, at a station in the WLAN plural consecutive packets including plural sounding packets, each sounding packet corresponding to a different subset of the set of antennas, and at least one of the plural consecutive packets including (i) a high throughput (HT) control field including a signal to initiate antenna selection and (ii) a number N indicative of a number of sounding packets which follow the at least one packet including the HT control field and which are to be used for antenna selection;
   estimating a channel matrix based on a characteristic of the channel as indicated by the received N sounding packets; and
   selecting a subset of antennas according to the channel matrix, wherein the receiving further comprises receiving a non-ZLF+HTC packet immediately followed by plural consecutive zero length frame (ZLF) sounding packets, the non-ZLF+HTC packet having an antenna selection control (ASC) field including a transmit antenna selection sounding indication (TXASSI) signal to initiate antenna selection and a number N of the plural consecutive ZLF sounding packets.

2. The method of claim 1, wherein the receiving further comprises receiving the plural consecutive packets within a single transmit opportunity (TXOP), which is defined by a media access (MAC) layer protocol of the WLAN.

3. The method of claim 1, wherein the receiving further comprises receiving the plural consecutive packets within plural transmit opportunities (TXOPs), each TXOP defined by a media access (MAC) layer protocol of the WLAN, and a first packet received in each TXOP includes the HT control field in a MAC header.

4. The method of claim 1, wherein the receiving comprises receiving zero length frame (ZLF) sounding packets.

5. The method of claim 1, wherein the receiving comprises receiving at least one sounding packet including a HT control field in MAC header of the at least one sounding packet.

6. The method of claim 5, wherein the receiving further comprises receiving the at least one sounding packet, which includes an antenna selection control (ASC) field including a transmit antenna selection sounding indication (TXASSI) signal to initiate antenna selection, and the number N.

7. The method of claim 5, wherein the receiving further comprises receiving the at least one sounding packet, which includes an antenna selection control (ASC) field including a receive antenna selection sounding indication (RXASSI) signal to initiate antenna selection, and the number N.

8. The method of claim 1, wherein the receiving further comprises receiving a non-ZLF+HTC packet immediately followed by plural consecutive zero length frame (ZLF) sounding packets, the HT control packet having an antenna selection control (ASC) field including a receive antenna selection sounding indication (RXASSI) signal to initiate antenna selection and a number N of the plural consecutive ZLF sounding packets.

9. The method of claim 1, wherein the selecting further comprises selecting receive antennas.

10. The method of claim 1, wherein the selecting further comprises selecting transmit antennas.

11. The method of claim 1, comprising performing said receiving, estimating and selecting steps in a media access control layer protocol of the WLAN.

12. The method of claim 1, wherein at least one of the plural sounding packets includes data.

13. The method of claim 1, wherein at least one of the plural sounding packets includes no data.

14. The method of claim 1, further comprising selecting beams according to the channel matrix.

15. The method of claim 1, further comprising indicating the selected subset of antennas by an index.

16. The method of claim 1, wherein the receiving further comprises receiving the plural consecutive packets at a receive station.

17. The method of claim 1, wherein the receiving further comprises receiving the plural consecutive packets at a transmit station.

18. The method of claim 1, wherein the received sounding packets are transmitted using each subset of antennas of a transmit station.

19. The method of claim 1, further comprising replying to each packet after receiving each of the plural consecutive packets.

20. The method of claim 1, further comprising replying to each packet after receiving all the plural consecutive packets.

21. A station in a multiple-input, multiple-output (MIMO) wireless local area network (WLAN) including a plurality of stations, each station including a set of antennas, said station comprising:
   a receiver configured to receive, via a channel, plural consecutive packets including plural sounding packets, each sounding packet corresponding to a different subset of the set of antennas, and at least one of the plural consecutive packets including (i) a high throughput (HT) control field including a signal to initiate antenna selection and (ii) a number N indicative of a number of sounding packets which follow the at least one packet including the HT control field and which are to be used for antenna selection;
   an estimating unit configured to estimate a channel matrix based on a characteristic of the channel as indicated by the received N sounding packets; and
   a selecting unit configured to select a subset of antennas according to the channel matrix, wherein the receiver is further configured to receive a non-ZLF+HTC control packet immediately followed by plural consecutive zero length frame (ZLF) sounding packets, the non-ZLF+HTC packet having an antenna selection control (ASC) field including a receive antenna selection sounding indication (RXASSI) signal to initiate antenna selection and a number N of the plural consecutive ZLF sounding packets.

22. The station of claim 21, wherein the receiver is further configured to receive the plural consecutive packets within a single transmit opportunity (TXOP), which is defined by a media access (MAC) layer protocol of the WLAN.

23. The station of claim 21, wherein the receiver is further configured to receive the plural consecutive packets within plural transmit opportunities (TXOPs), each TXOP defined by a media access (MAC) layer protocol of the WLAN, and a first packet received in each TXOP includes the HT control field in a MAC header.

24. The station of claim 21, wherein the receiver is further configured to receive zero length frame (ZLF) sounding packets.

25. The station of claim 21, wherein the receiver is further configured to receive at least one sounding packet including a HT control field in the MAC header of the at least one sounding packet.

26. The station of claim 25, wherein the receiver is further configured to receive the at least one sounding packet, which includes an antenna selection control (ASC) field including a transmit antenna selection sounding indication (TXASSI) signal to initiate antenna selection, and the number N.

27. The station of claim 25, wherein the receiver is further configured to receive the at least one sounding packet, which includes an antenna selection control (ASC) field including a receive antenna selection sounding indication (RXASSI) signal to initiate antenna selection, and the number N.

28. The station of claim 21, wherein the receiver is further configured to receive a non-ZLF+HTC packet immediately followed by plural consecutive zero length frame (ZLF) sounding packets, the non-ZLF+HTC packet having an antenna selection control (ASC) field including a transmit antenna selection sounding indication (TXASSI) signal to initiate antenna selection and a number N of the plural consecutive ZLF sounding packets.

* * * * *